US011553790B2

(12) United States Patent
Gulick et al.

(10) Patent No.: US 11,553,790 B2
(45) Date of Patent: Jan. 17, 2023

(54) SECURITY APPARATUS FOR A TABLET

(71) Applicant: Scorpion Security Products, Inc., Vestal, NY (US)

(72) Inventors: Franklyn W. Gulick, Binghamton, NY (US); Gary R. Page, Chenango Forks, NY (US); Patrick McEwen, Greene, NY (US); Andy Bartoszewski, Syracuse, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 17/241,678

(22) Filed: Apr. 27, 2021

(65) Prior Publication Data
US 2021/0330075 A1    Oct. 28, 2021

Related U.S. Application Data

(60) Provisional application No. 63/048,367, filed on Jul. 6, 2020, provisional application No. 63/015,767, filed on Apr. 27, 2020.

(51) Int. Cl.
*A47B 23/00* (2006.01)
*A47B 23/04* (2006.01)
*F16M 11/20* (2006.01)
*G06F 1/16* (2006.01)

(52) U.S. Cl.
CPC ......... *A47B 23/04* (2013.01); *F16M 11/2021* (2013.01); *G06F 1/1637* (2013.01); *A47B 2023/049* (2013.01); *F16M 2200/021* (2013.01)

(58) Field of Classification Search
None
See application file for complete search history.

(56) References Cited

U.S. PATENT DOCUMENTS

| 3,991,967 | A | * | 11/1976 | Sack | A47B 23/043 248/456 |
| 5,607,135 | A | * | 3/1997 | Yamada | A47G 1/1646 248/463 |
| 6,017,012 | A | * | 1/2000 | Henson, Jr. | A47G 1/142 248/460 |
| 6,971,622 | B2 | * | 12/2005 | Ziegler | H04M 1/12 248/455 |
| 7,762,519 | B2 | * | 7/2010 | Kunii | F16M 11/10 248/688 |

FOREIGN PATENT DOCUMENTS

WO    WO-9638070 A1 * 12/1996    ............. A47B 23/00

* cited by examiner

*Primary Examiner* — Steven M Marsh
(74) *Attorney, Agent, or Firm* — Barclay Damon LLP

(57) ABSTRACT

A security apparatus comprises a support assembly and a keyboard retainer. The support assembly comprises a first retaining portion, a second retaining portion pivotally coupled to the first retaining portion, and a lock assembly defining a locked state and an unlocked state. The keyboard retainer comprises at least one base member pivotally coupled to the first and second retaining portions and included a top surface extending along a top surface plane, and an opposing bottom surface. The at least one base member comprises one or more securing members extending from the bottom surface of the first base, and one or more retainers extending above the top surface plane of the first and each retainer comprising a retaining member extending away from the first base.

10 Claims, 23 Drawing Sheets

SECURITY APPARATUS FOR A TABLET

CROSS-REFERENCE TO RELATED APPLICATIONS

This non-provisional patent application claims priority to and the benefit of U.S. Patent Application No. 63/015,767, filed Apr. 27, 2020, and U.S. Patent Application No. 63/048,367, filed on Jul. 6, 2020. The entire contents of these applications is hereby incorporated by reference.

TECHNOLOGICAL FIELD

This disclosure and the claimed device relates to a security apparatus for a tablet with a detachable keyboard that enables secure and functional display of both the tablet and the keyboard in a retail setting. In one embodiment, the disclosed security apparatus comprises a tablet security apparatus that is configured to secure and functionally display an iPad® tablet that is coupled to a Magic Keyboard®. In another embodiment, the security assembly further comprises a mounting plate configured to couple the tablet security apparatus to a display fixture.

BACKGROUND

Retailers sell a wide range of portable or hand held electronic devices that can assist in or perform a multitude of tasks for the a user or customer. One such portable electronic device is the tablet computer or tablet. As tablets have become more and more popular, manufacturers have begun to produce various accessories to be connected to and used with the tablets. Detachable keyboards have become especially popular because they allow the tablet to be used like a laptop computer when the keyboard is attached, but also allow detachment of the keyboard to use a tablet. The detachable keyboard can couple to the tablet in a variety of manners, including a magnetic connection. Another part of the attraction of the detachable keyboard is that it can be articulated in a variety of positions with respect to the tablet in order to suit the needs and comfort of the user. Part of the purchasing experience is having the ability to examine and test the tablet along with the detachable keyboard. This is done using floor models that are fitted with some form of security apparatus to prevent theft of the portable electronic device.

The current security apparatuses used to secure table computers with detachable keyboards in the retail setting are either overly complicated and cumbersome, or they sacrifice security for functional display. Cumbersome and overly complicated security apparatuses tend to be very good at preventing theft of tablets with detachable keyboards, but limit the customer interaction with both devices. These security apparatuses are also expensive to manufacture and purchase. Conversely, simpler and less complex security apparatuses can allow for improved customer interaction with the tablet and detachable keyboard, however are less effective at preventing theft of these devices.

These are just some of the problems associated with current security apparatuses for tablets with detachable keyboards.

SUMMARY

An embodiment of a security apparatus comprises a display support and a keyboard retainer. The display support comprises a first retaining portion including a first holder, a second retaining portion pivotally coupled to the first retaining portion and includes a second holder, and a lock assembly defining a locked state and an unlocked state. They keyboard retainer comprises a first base pivotally coupled to the first retaining portion and including a top surface extending along a top surface plane, and an opposing bottom surface. The first base comprises one or more securing members extending from the bottom surface of the first base and one or more retainers extending above the top surface plane of the first and each retainer comprises a retaining member extending away from the first base. A second base pivotally couples to the second retaining portion and includes a top surface extending along a top surface plane, and an opposing bottom surface. One or more securing members extend from the bottom surface of the second base and one or more retainers extending above the top surface plane of the second base and each retainer comprises a retaining member extending away from the second base. When the lock assembly is in the unlocked state, the first holder and the second holder are enabled to pivot relative to each other. When the lock assembly is in the locked state, the first holder and the second holder are inhibited from pivoting relative to each other.

In an embodiment, the first holder further comprises a first brace extending from the first support, wherein the first brace and first support extend along a same plane. In an embodiment, the second holder further comprises a second brace extending from the second support, wherein the second brace and second support extend along a same plane. In a further embodiment, the first holder further comprises at least one side extending along a side axis, the at least partially defines a pocket, the second holder further comprises at least one side that at least partially defines a pocket, and at least one of the sides defines an opening. In another embodiment, the one or more securing members comprise a threaded surface. In an embodiment, the first holder and the second holder each comprise an end portion, wherein the end portion extends along an axis that intersects the side axis.

In another embodiment, a security apparatus for a portable electronic device comprises a support assembly and a keyboard retainer. The support assembly comprises a first retaining portion, a second retaining portion pivotally coupled to the first retaining portion, and a lock assembly defining a locked state and an unlocked state. When in the unlocked state, the first retaining portion and the second retaining portion are enabled to pivot relative to each other, and when in the locked state, the first retaining portion and the second retaining portion are inhibited from pivoting relative to each other. The keyboard retainer comprises a first base pivotally coupled to the first retaining portion and included a top surface extending along a top surface plane, and an opposing bottom surface. The first base comprises one or more securing members extending from the bottom surface of the first base, and one or more retainers extending above the top surface plane of the first and each retainer comprising a retaining member extending away from the first base. A second base is pivotally coupled to the second retaining portion and includes a top surface extending along a top surface plane, and an opposing bottom surface. The second base comprises one or more securing members extending from the bottom surface of the second base, and one or more retainers extending above the top surface plane of the second base and each retainer comprising a retaining member extending away from the second base.

In an embodiment, the first retaining portion defines a pocket configured to retain a portion of a portable electronic device. In an embodiment, the second retaining portion defines a pocket configured to retain a portion of a portable electronic device. In an embodiment, the one or more securing members comprise a threaded surface.

An embodiment of a security system for a portable electronic device comprises a mounting plate defining one or more openings and a security apparatus. The security apparatus comprises a first retaining portion, a second retaining portion pivotally coupled to the first retaining portion, and a lock assembly defining a locked state and an unlocked state. When in the unlocked state, the first retaining portion and the second retaining portion are enabled to pivot relative to each other, and when in the locked state, the first retaining portion and the second retaining portion are inhibited from pivoting relative to each other. The security apparatus further includes a keyboard retainer comprising at least one base member pivotally coupled to the first retaining portion and the second retaining portion. The at least one base member includes a top surface extending along a plane and an opposing bottom surface. The at least one base member comprises one or more securing members extending from the bottom surface and configured to couple to the mounting plate, and one or more retainers extending above the top surface plane and each retainer comprising a retaining member extending away from the at least one base member. The mounting plate is configured to support the portable electronic device and the security apparatus.

In an embodiment, the mounting plate further comprises one or more anchors configured to couple the mounting plate to a display fixture. In an embodiment, the first retaining portion defines a pocket configured to retain a portion of a portable electronic device. In an embodiment, the second retaining portion defines a pocket configured to retain a portion of a portable electronic device. In an embodiment, the one or more securing members comprise a threaded surface.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following discussion relates to various embodiments of a tablet security apparatus. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the tablet security apparatus and are not specifically provided to scale.

Figure 1:
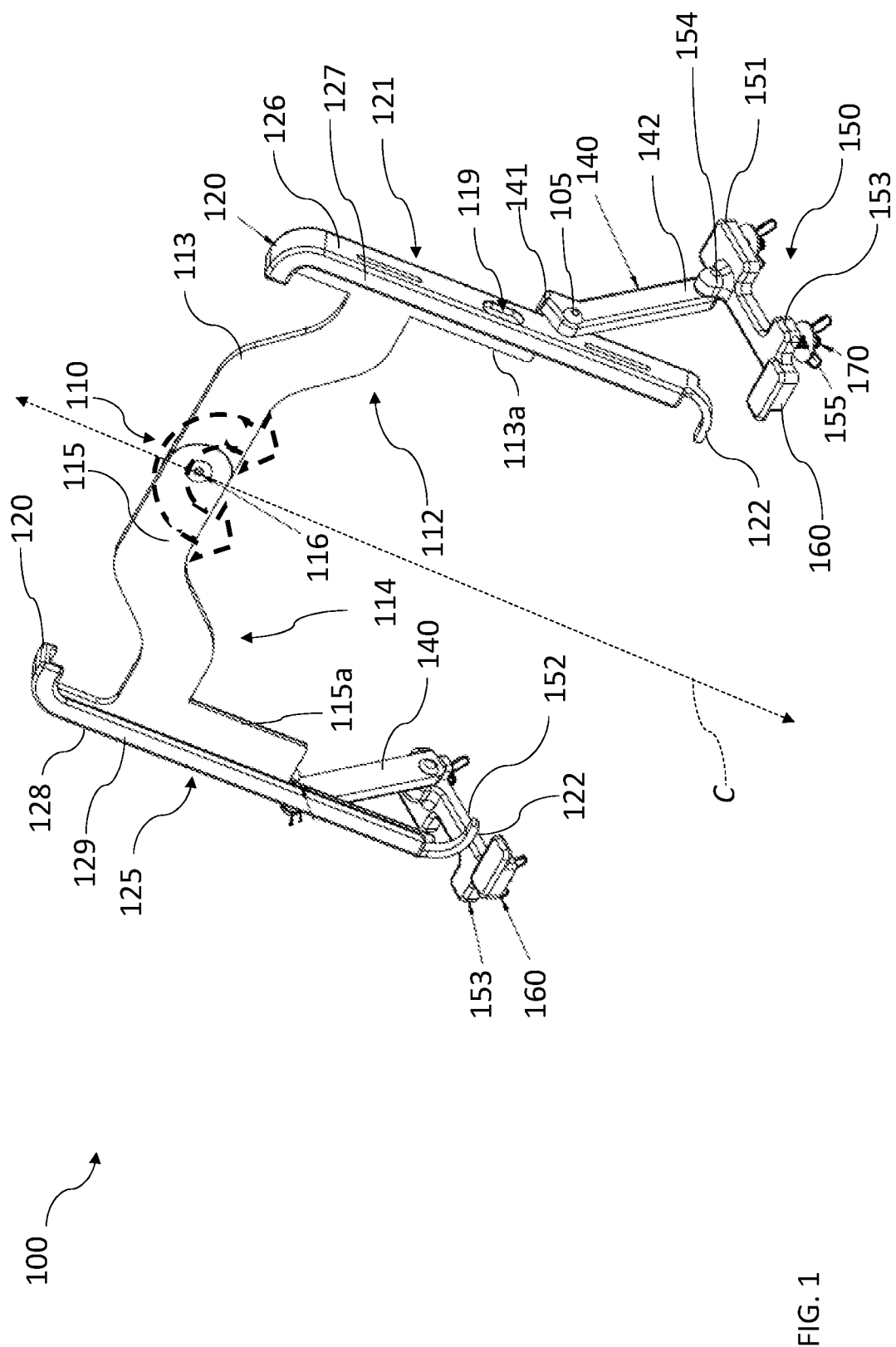
FIG. 1 illustrates a perspective front view of an embodiment of a tablet security apparatus.
Figure 2:
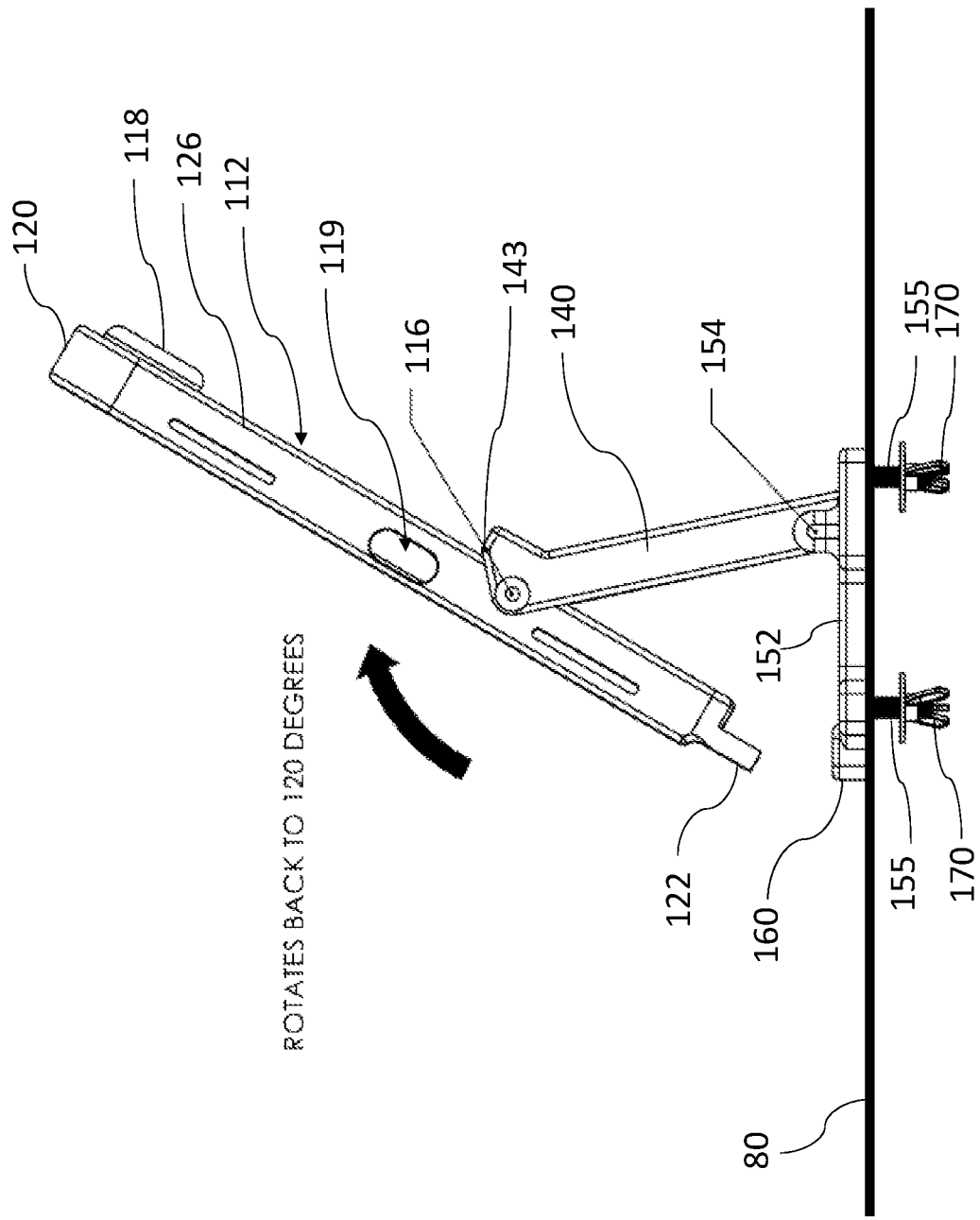
FIG. 2 a left side elevation view of the embodiment of the tablet security apparatus of FIG. 1.

FIGS. 1 and 2 illustrate an embodiment of the tablet security assembly comprising a tablet security apparatus ("security apparatus") 100 without a tablet 50 or detachable keyboard or keyboard accessory 60 installed. FIGS. 3-13 show the security apparatus 100 in various positions while the tablet 50 and the detachable keyboard accessory 60 are installed.

As shown in FIGS. 1 and 2, the security apparatus 100 generally comprises a tablet or display support 110 that is pivotally coupled to a base 150 by one or more support extensions 140. The tablet support 110 includes a first retaining portion 112 and a second retaining portion 114. The first retaining portion 112 comprises a first support 113 and a first brace 113a. The first brace 113a extends from the first support 113 and acts to provide structural rigidity as well as surface for the tablet 50 to rest on when it is installed in the security apparatus 100. The first support 113 and the first brace 113a extend along the same plane. The second retaining portion 114 includes a second support 115 and a second brace 115a. The second brace 115a extends from the second support 115 and provides structural rigidity as well as surface for the tablet 50 to rest on when it is installed in the security apparatus 100. The second support 115 and the second brace 115a extend along the same plane.

The first retaining portion 112 and the second retaining portion 114 are configured to be pivotally coupled together at a pivot point 30. The coupling may be done using a fastening means that enables the first retaining portion 112 and the second retaining portion 114 to pivot relative to each other. The first retaining portion 112 and the second retaining portion 114 exist in an unlocked state and a locked state. In the unlocked state, the first and second retaining portions 112, 114 are enabled to pivot relative to each other. In a locked state, the first and second retaining portions 112, 114 are inhibited from pivoting relative to each other. The pivoting motion acts to move one set of opposing ends of the first and second retaining portions towards each other, while at the same time moving the second set of opposing ends of the first and second retaining portions 112, 114 away from each other, similar to a clam shell opening. The fastening means may comprise a lock that is moved between the locked and unlocked state using a key. In an embodiment, the key is magnetic and locks and/or unlocks the lock via a magnetic field. In another embodiment, the lock comprises a biometric sensor that senses a biometric input, such as a finger print, or retinal scan, and locks and/or unlocks the lock when the biometric input matches a stored biometric input. In still another embodiment, the lock may be controlled using a Bluetooth® key or signals over a Bluetooth® connection or using radio-frequency identification technology.

The first retaining portion 112 further includes a first holder 121 having a side 126 extending from the first brace 113a or the first support 113 along a plane that intersects the plane of the first brace 113a. A lip 127 extends from the side 126 along a plane above the plane of the first brace 113a to create a pocket. The ends 120, 122 of the first holder 121 may be curved, bent, or otherwise pointed towards the center line C. The second retaining portion 114 further includes a second holder 125 having a side 128 extending from the second brace 115a along a plane that intersects the plane of the second brace 115a. A lip 129 extends from the side 128 along a plane above the plane of the second holder 125 or second brace 115a to create a pocket. The ends 120, 122 of the second holder 125 are similar to those of the first holder 121 and may be curved, bent, or otherwise pointed towards the center line C. The first and/or second holders 121, 125 may define one or more openings 119 that allow access to buttons and/or ports of the tablet while the tablet is installed in the security apparatus 100. One or more components of the first retaining portion 112 and the second retaining portion 114 may be formed as a single unitary component.

Still referring to FIGS. 1 and 2, the base 150 comprises a base body 152 having a first end 151 and an second end 153. The embodiments of the security apparatus 100 that are depicted in the figures comprise two identical bases 150 coupled to the tablet support 110 via two support extensions 140 such that it will only be necessary to describe one base 150 and one support extension 140. Of course, other embodiments may comprise bases 150 and/or support extensions 140 that differ from each other in one or more aspects. In still other embodiments, one or more support extensions 140 couple the tablet support 110 to a single base. A support extension mount 154 is positioned proximate the first end 151 of the base body 152 and a keyboard retainer 160 is positioned proximate the second end 153 of the base body 152. One or more securing members 155 extend from the bottom surface of the base body 152. The one or more securing members 155 may define surface features, such as threads, and are configured to traverse a display fixture or display surface 80 or display fixture. A securing member coupler 170 is configured to couple to and secure the base body 152 to the display surface 80. The securing member coupler 170 may be a wingnut, other nut, or any other means to couple to the securing members 155 and secure the base body 152 to the display surface 80. The securing member couplers 170 secure to the underside of the display surface 80 and cannot be accessed by an unauthorized person since access to the underside of the display surface is inhibited by one or more locked doors or a wall.

A support extension 140 pivotally couples the display support or tablet support 110 to the base 150. A first end 141 of the support extension 140 is pivotally coupled the first holder 121 at a pivot point 105. A fastener may be positioned at the pivot point 105 to couple the support extension 140 to the first holder 121 in a manner that enables the first holder 121 to pivot relative to the support extension 140. The second end 142 of the support extension 140 pivotally couples to the support extension mount 154 of the base body 152. When the base body 152 is secured to the display surface 80, the support extension 140 is configured to pivot relative to the base body 152.

Figure 3:
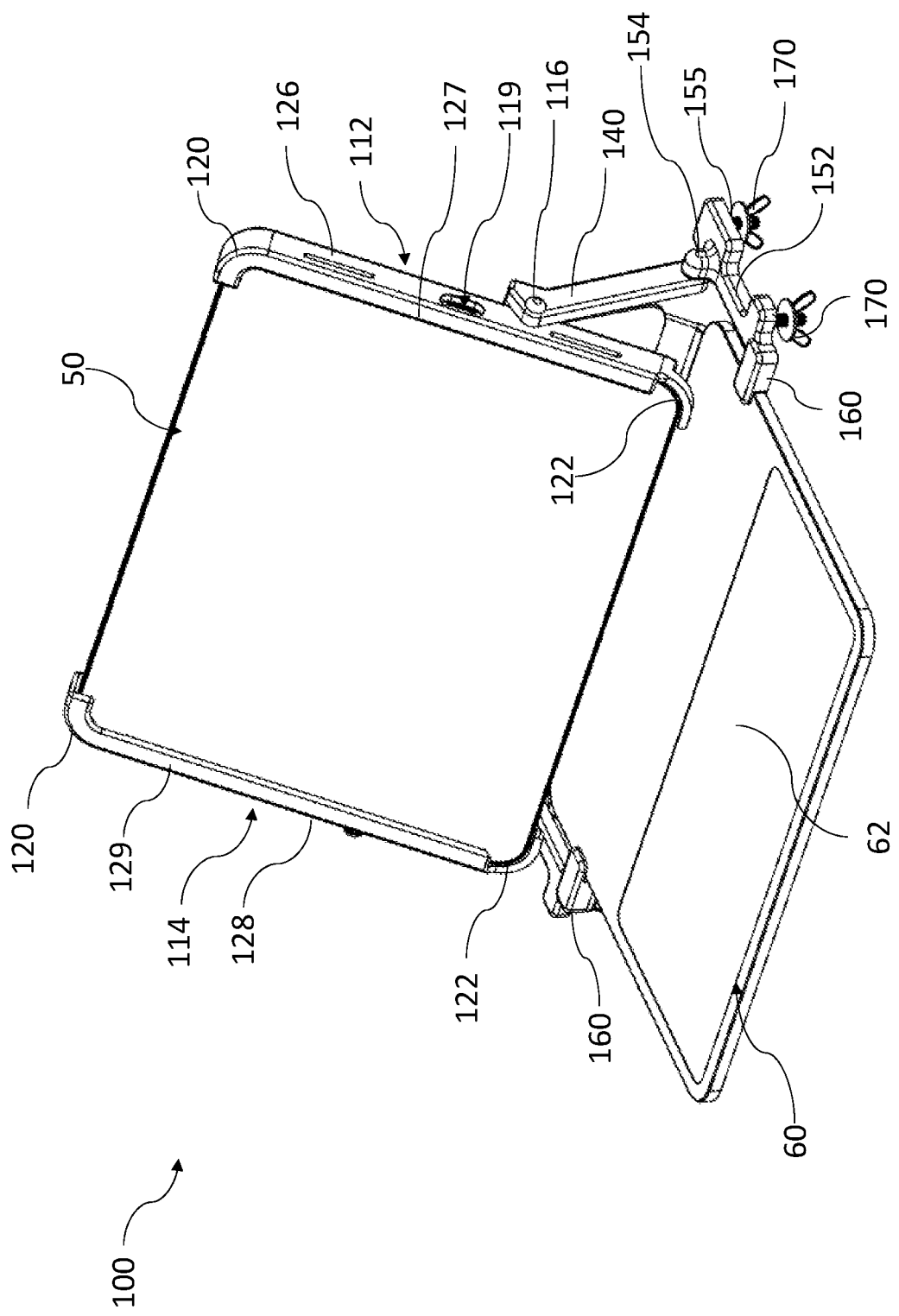
FIG. 3 illustrates a front perspective view of an embodiment of the tablet security apparatus securing a tablet and detachable keyboard in an open position.
Figure 4:
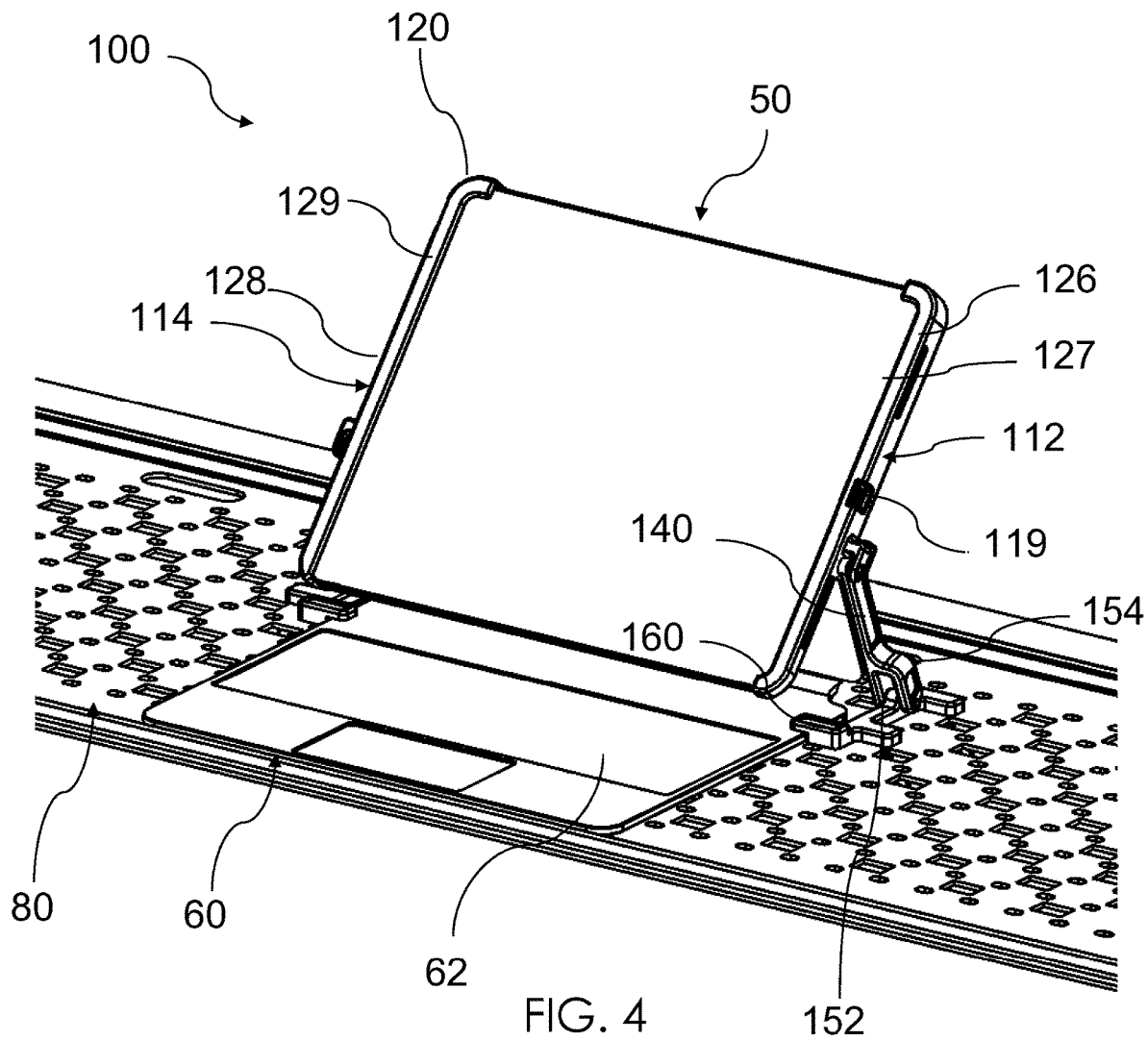
FIG. 4 illustrates a front perspective view of an embodiment of the tablet security apparatus securing a tablet and detachable keyboard in the open position.
Figure 5:
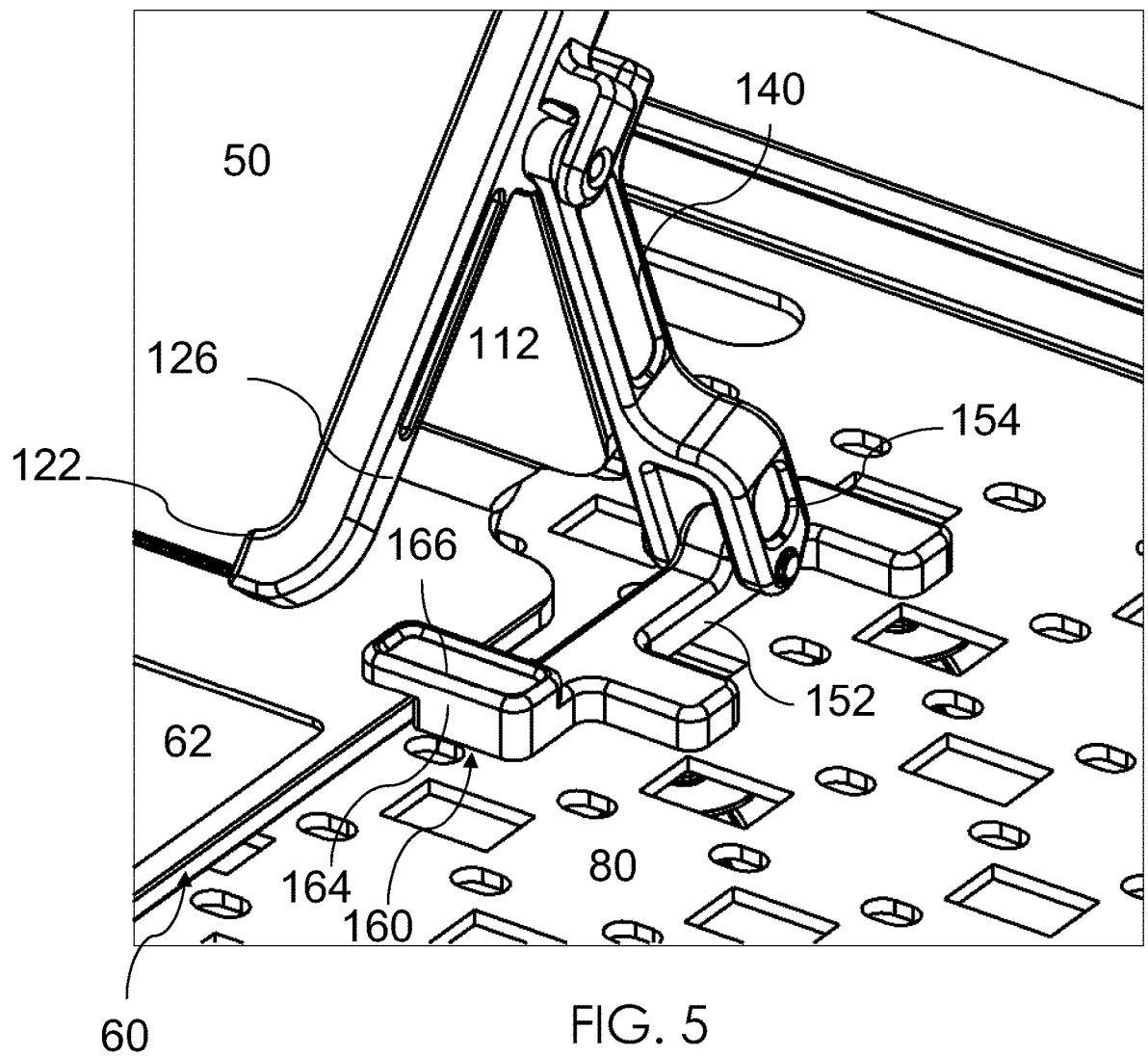
FIG. 5 illustrates a close-up front perspective view of an embodiment of the tablet security apparatus securing a tablet and detachable keyboard in the open position.
Figure 6:
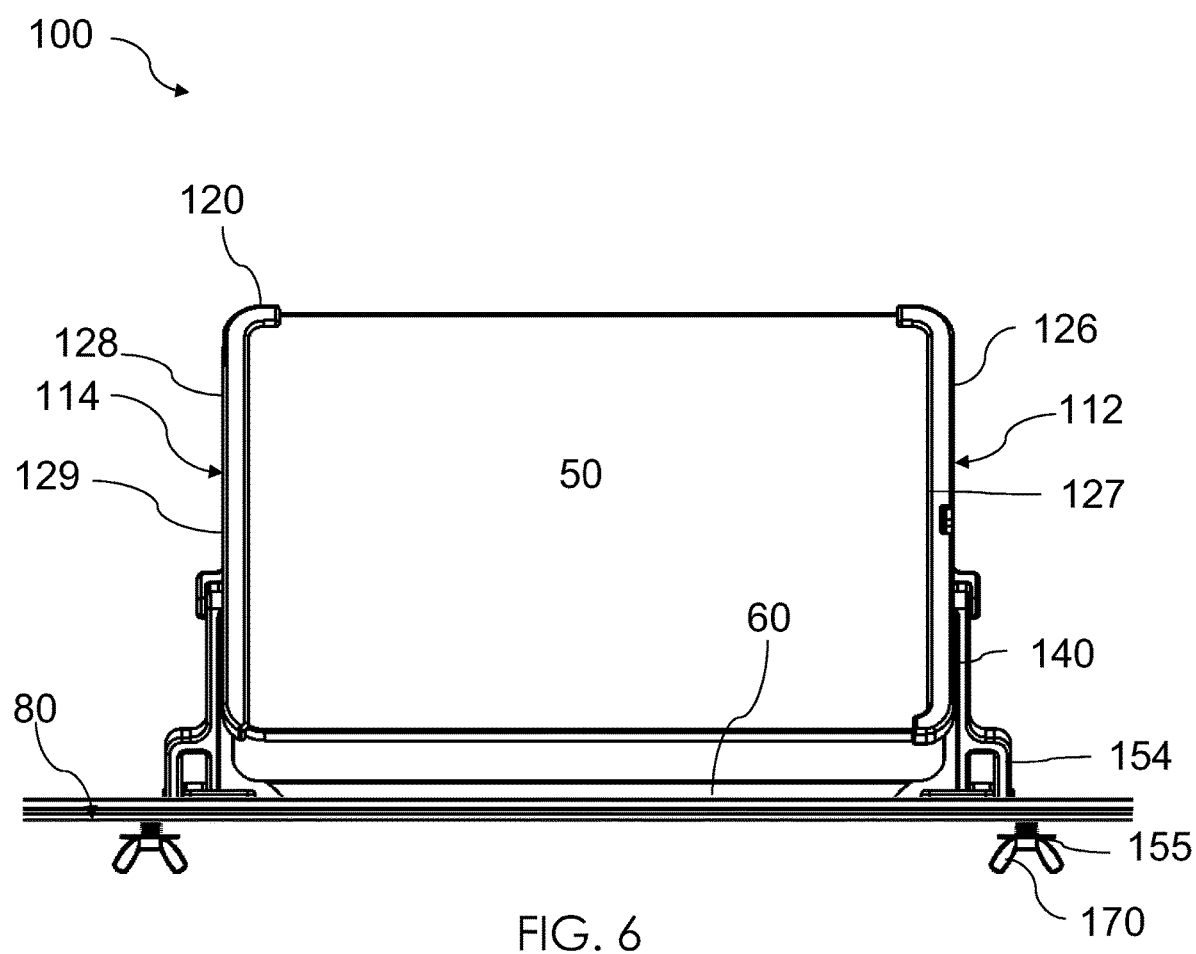
FIG. 6 illustrates a front plan view of an embodiment of the tablet security apparatus securing a tablet and detachable keyboard in the open position.

Turning now to FIGS. 3-13, installation and removal of the tablet 50 and detachable keyboard 60 will not be described along with the functional display capabilities of the security apparatus. In order to install the tablet 50 coupled to the detachable keyboard accessory 60 into the security apparatus 100, the security apparatus 100 is detached from the display surface 80. The lock 116 is then moved to the unlocked state and the curved ends 122 (or 120) of the first and second holders 121, 125 are pivoted away from each other. The tablet 50 with a detachable keyboard accessory 60 is inserted into the tablet support 110 such that the lips 127, 129 and the pocket retain the sides and the tablet 50, and/or at least a portion of the detachable keyboard accessory 60 rests on the first and second braces 113a, 115a. As the tablet 50 with the detachable keyboard accessory 60 in inserted, the curved ends 122 (or 120) of the first and second holders 121, 125 are brought towards each other such that the tablet 50 and a portion of the detachable keyboard accessory 60 "snaps" into tablet support 110. The lock 116 is then moved to the locked state such that the first retaining portion 112 and the second retaining portion 114 cannot move relative to each other. The tablet 50 and detachable keyboard accessory 60 are now installed into and secured in the security apparatus 100. The security apparatus 100 is then secured to the display surface 80 as was described above thereby securing the tablet 50 and detachable keyboard accessory 60 to the display surface 80. The keyboard 62 of the detachable keyboard accessory 60 is capable of resting on the display surface 80 while it is secured in the security apparatus 100. Referring specifically to FIGS. 3-5, security apparatus 100 is in an open position such that the keyboard 62 of the detachable keyboard accessory 60 and the display of the tablet 50 can be used as a laptop computer. The tablet 50 is positioned at an angle α relative to the keyboard 62. In the fully open position, the angle α is about 120° (FIG. 8) and the tablet 50 appears to float above the keyboard 62.

Figure 10:
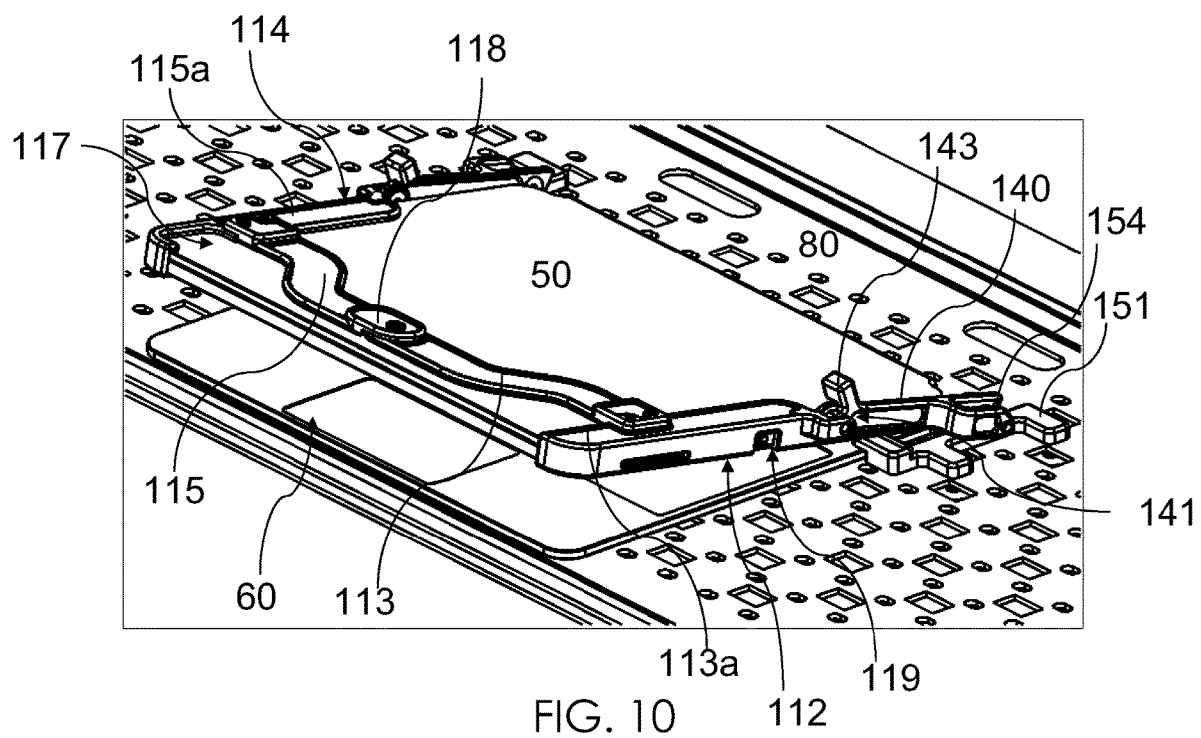
FIG. 10 illustrates a front perspective view of the of the tablet security apparatus securing a tablet and detachable keyboard in a closed position.
Figure 11:
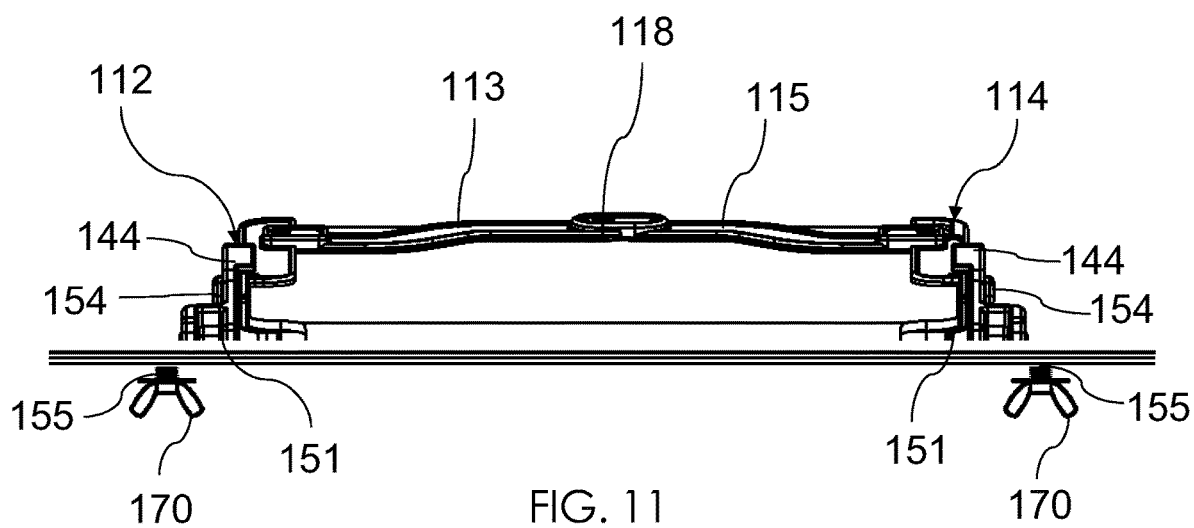
FIG. 11 illustrates a rear perspective view of the tablet security apparatus securing a tablet and detachable keyboard in the closed position.
Figure 12:
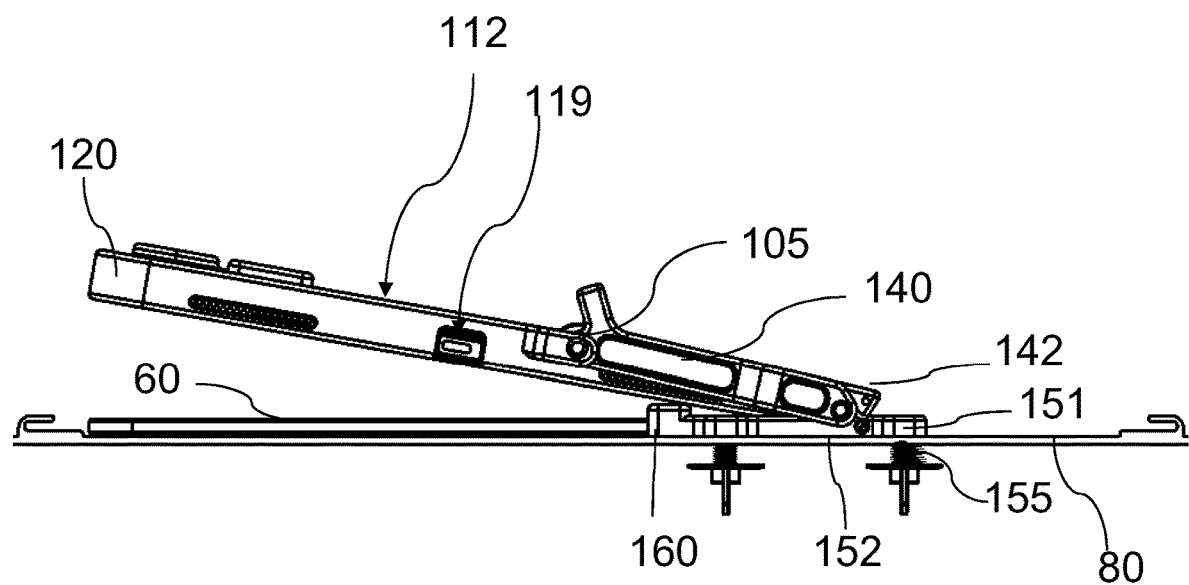
FIG. 12 illustrates a left side elevation view of the tablet security apparatus securing a tablet and detachable keyboard in the closed position.
Figure 13:
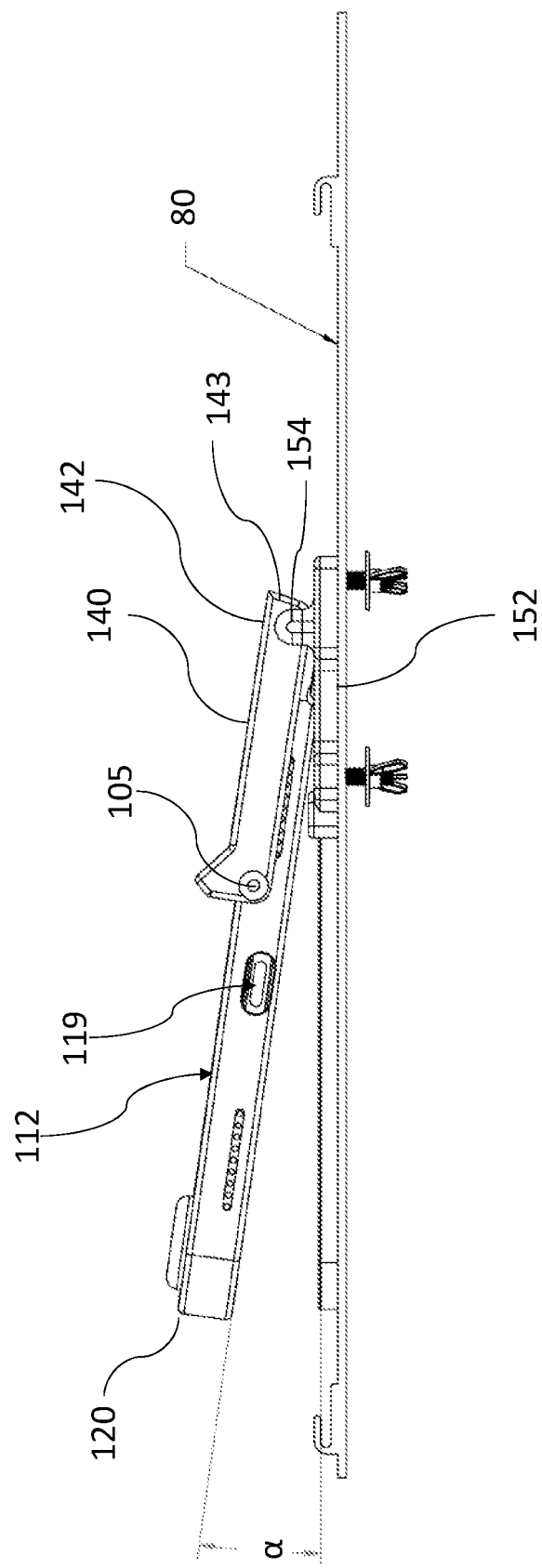
FIG. 13 illustrates another left side elevation view of the tablet security apparatus securing a tablet and detachable keyboard in the closed position.

In the fully open position, the first retaining portion 112 and the second retaining portion 114 contact the stop surface 143 of the support extension 140 (FIG. 10). The stop surface 143 is defined at the first end 141 of the support extension 140. In the open position, the bottom surface 144 of the support extension 140 contacts and rests on the top surface of the base body 152 proximate the first end 151 of the base body 152. The support extension 140 is free to pivot about the support extension mount 154 to vary the position of the support extension 140 and the tablet 50 installed into the tablet support 110 relative to the display surface 80 and the keyboard 62. The tablet support 110 is coupled to the first end 141 of the support extension 140 and further configured to pivot relative to the support extension 140. The pivoting is meant to correspond to the movement of the detachable keyboard accessory 60 and its corresponding components relative to the tablet as the customer would experience during personal use.

Once the tablet 50 is installed in the tablet support 110 of the security apparatus 100, a portion of the detachable keyboard accessory 60 is also secured by the tablet support 110 such that the keyboard 62 is securely "tethered" to the tablet 50. In this embodiment, the keyboard 62 is capable of moving relative to the display surface 80, however as specifically shown in the embodiment of FIG. 5, the base body 152 may comprise a keyboard retainer 160 including a mounting block 164 that extends above the plane of the upper surface of the base body 152. A retaining element 166 extends away from the base body 152 and partially over and/or contacting the keyboard 62 to inhibit movement of the keyboard 62 relative to the display surface 80.

Figure 7:
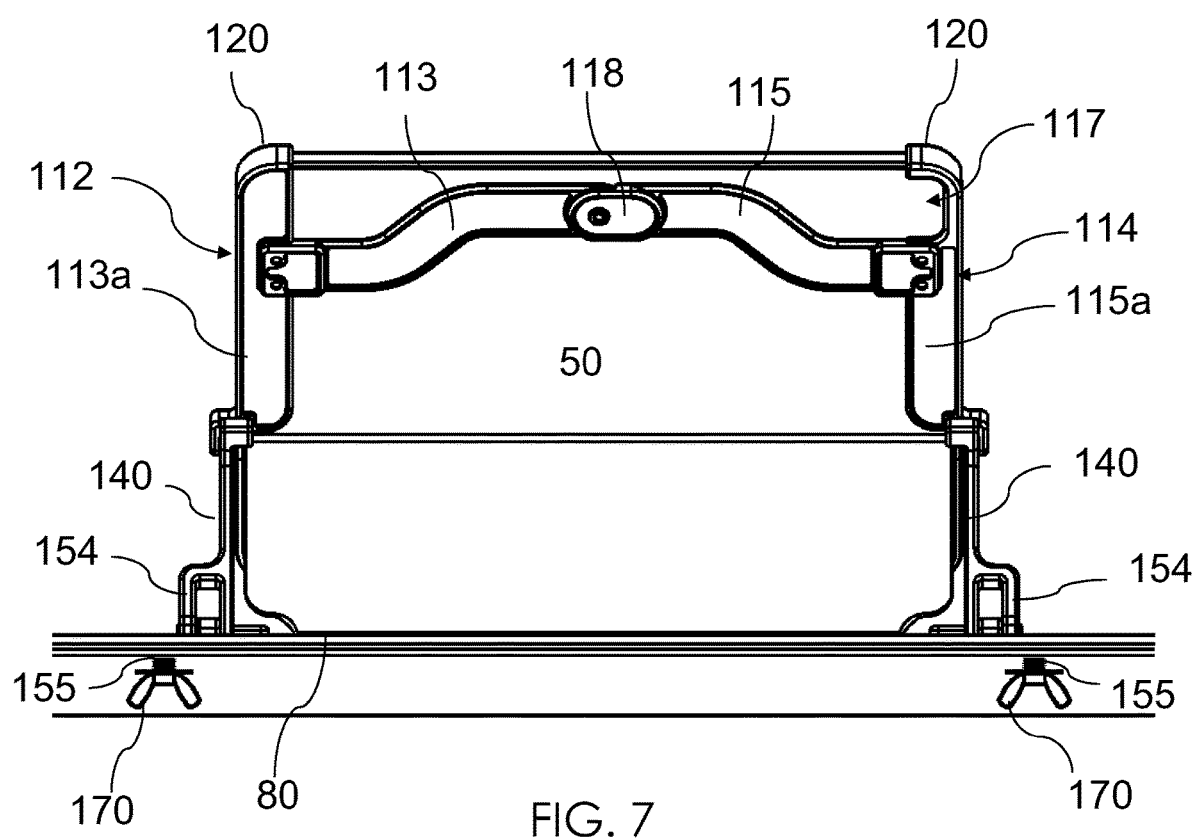
FIG. 7 illustrates a rear perspective view of the tablet security apparatus securing a tablet and detachable keyboard in the open position.
Figure 8:
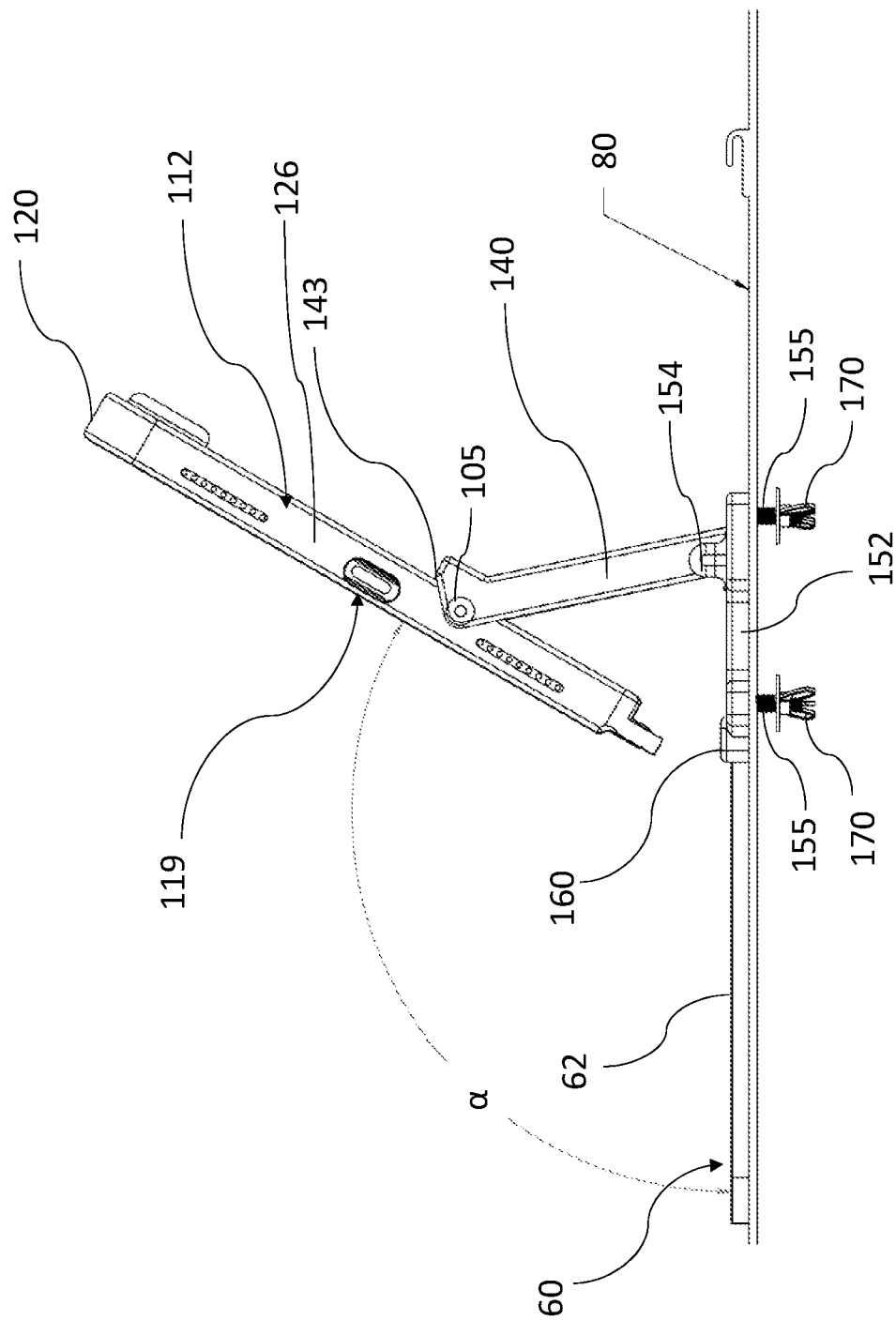
FIG. 8 illustrates a left side elevation view of the tablet security apparatus securing a tablet and detachable keyboard in the open position.
Figure 9:
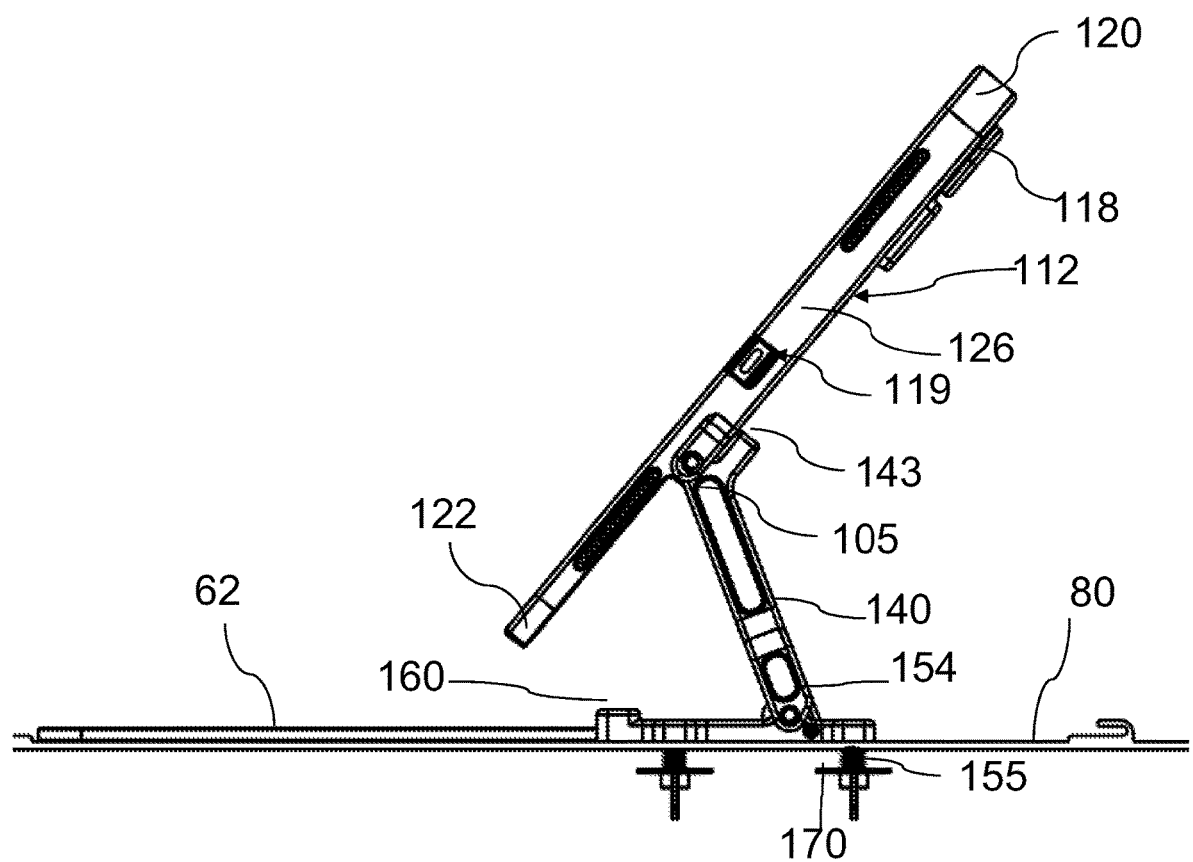
FIG. 9 illustrates another left side elevation view of the tablet security apparatus securing a tablet and detachable keyboard in the open position.

Referring to FIG. 7, the lock 116 may comprise a covering 118 on the back side facing away from the tablet 50 in order to inhibit tampering and theft. The second brace 115a defines a cut-out 117 to accommodate the camera and prevent damage to the camera lens or lens cover as well as to allow the customer to test the quality of the tablet's camera while is it securely displayed.

The security apparatus 100 is also capable of displaying the tablet 50 and detachable keyboard accessory 60 in a closed position. Referring specifically to FIGS. 10-13, the tablet support 110 can be pivoted towards the keyboard 62 via the support extension 140 such that the display of the tablet 50 faces the keyboard 62. In the embodiments shown, the security features of the security apparatus 100 such as the first and second lips 127, 129 and the keyboard retainers 160, inhibit the tablet 50 from being brought into contact with the keyboard 62 such that the angle α is 0°. In the completely closed position, the angle is about 8°. In embodiments that do not have keyboard retainers 160, the keyboard 62 of the detachable keyboard accessory 60 is able to be pivoted towards the tablet 50, using the hinge that is part of the detachable keyboard accessory 60, into a closed position such that the angle may be less than 8°.

In order to remove the tablet 50 and detachable keyboard accessory 60 from the security apparatus 100, the security apparatus 100 is detached from the display surface 80 and the lock 116 is moved to the unlocked state. The first and second retaining portions 112, 114 are now able to be moved relative to each other to dislodge the tablet 50 and a portion of the detachable keyboard accessory 60 from the tablet support 110. Detaching the security apparatus 100 from the display surface 80 further acts to free the keyboard 62 from the keyboard retainer(s) 160.

The security apparatus 100 may be configured to accommodate different sizes of tablet 50 and detachable keyboard accessory 60. In an embodiment, the first and second holders 121, 125 may be capable of being extended away from (or closer to) each other to accommodate different sized tablets 50. In addition, the holders 121, 125 may further be capable of being adjusted to move their ends 120, 122 farther apart from (or closer to) each other.

Turning generally to FIGS. 14-22, the security assembly is part of a security system comprising a mounting plate 200 or adapter plate or support plate configured to couple to the security apparatus 100 at one or more coupling portions 232. Each coupling portion 232 may each include an extension or an opening configured to removeably couple to the security apparatus 100. In other embodiment, the coupling may be achieved or aided by using one or more mechanical fasteners, or welded joints. In another embodiment, one or more pieces of the mounting plate 200 and the security apparatus 100 may be formed as a single unitary component. The mounting plate 200 may comprise a generally planar frame 210 including a plurality of perimeter supports 212, 214, 216, 218 and a plurality of supplemental supports 211, 213, 215, 217. One or more spaces 206 may be defined between the perimeter supports 212, 214, 216, 218 and/or the supplemental supports 211, 213, 215, 217 that at least partially traverse the mounting plate 200. Of course alternate embodiments of the mounting plate 200 may have fewer or more supports as required. In an embodiment, the mounting plate 200 may not comprised defined supports and instead may be a single solid piece with no defined spaces 206.

Figure 14:
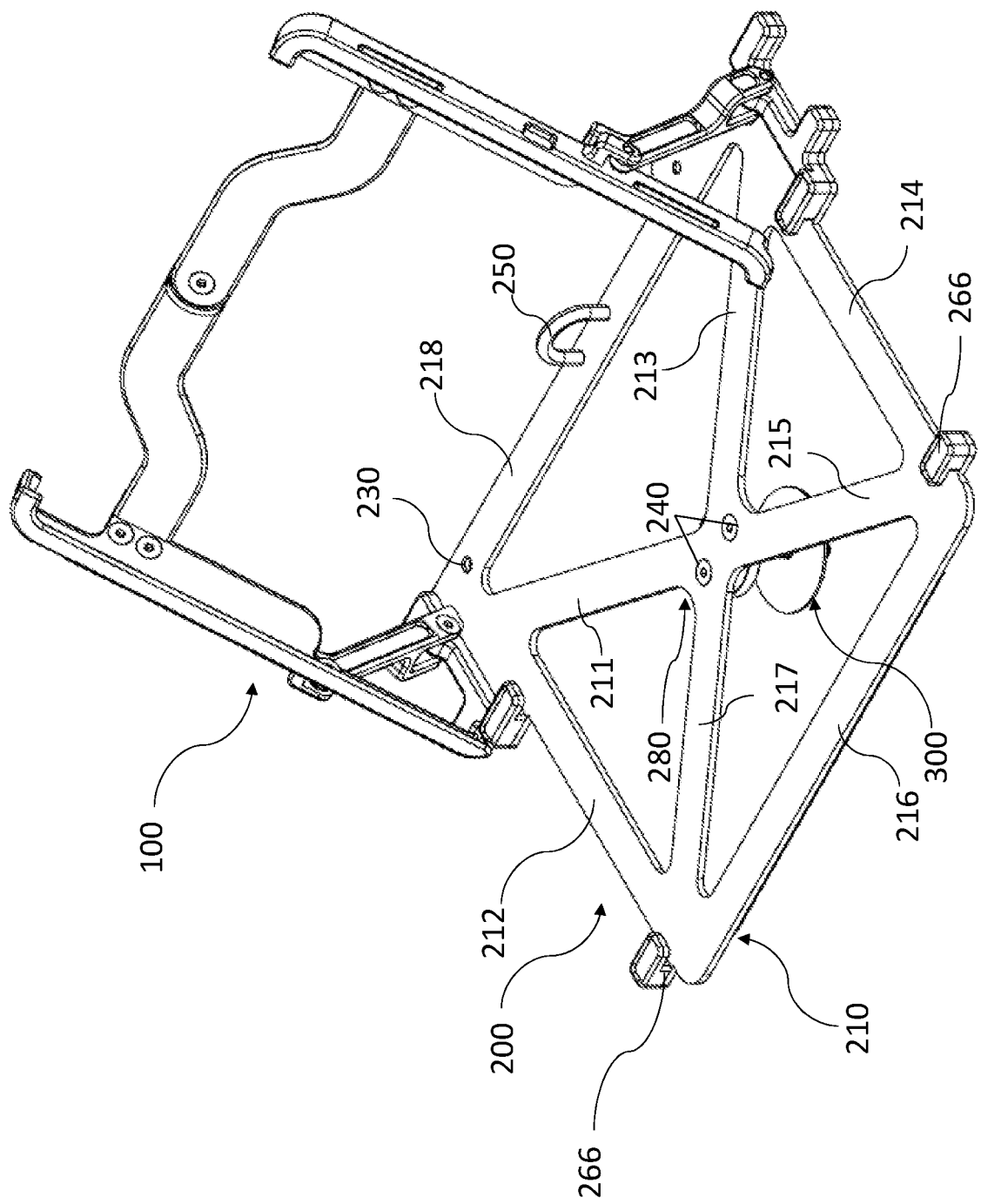
FIG. 14 illustrates an embodiment of the tablet security apparatus coupled to a mounting plate.
Figure 15:
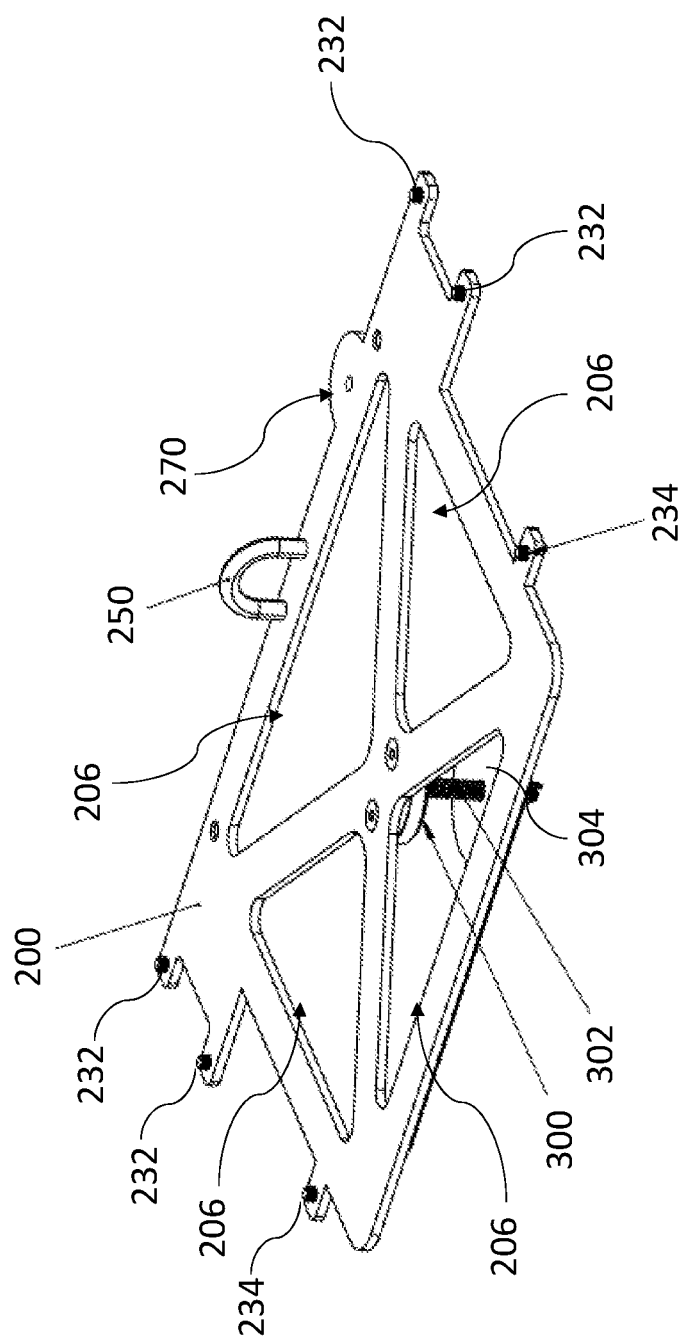
FIG. 15 illustrates a top perspective view of an embodiment of the mounting plate.
Figure 16:
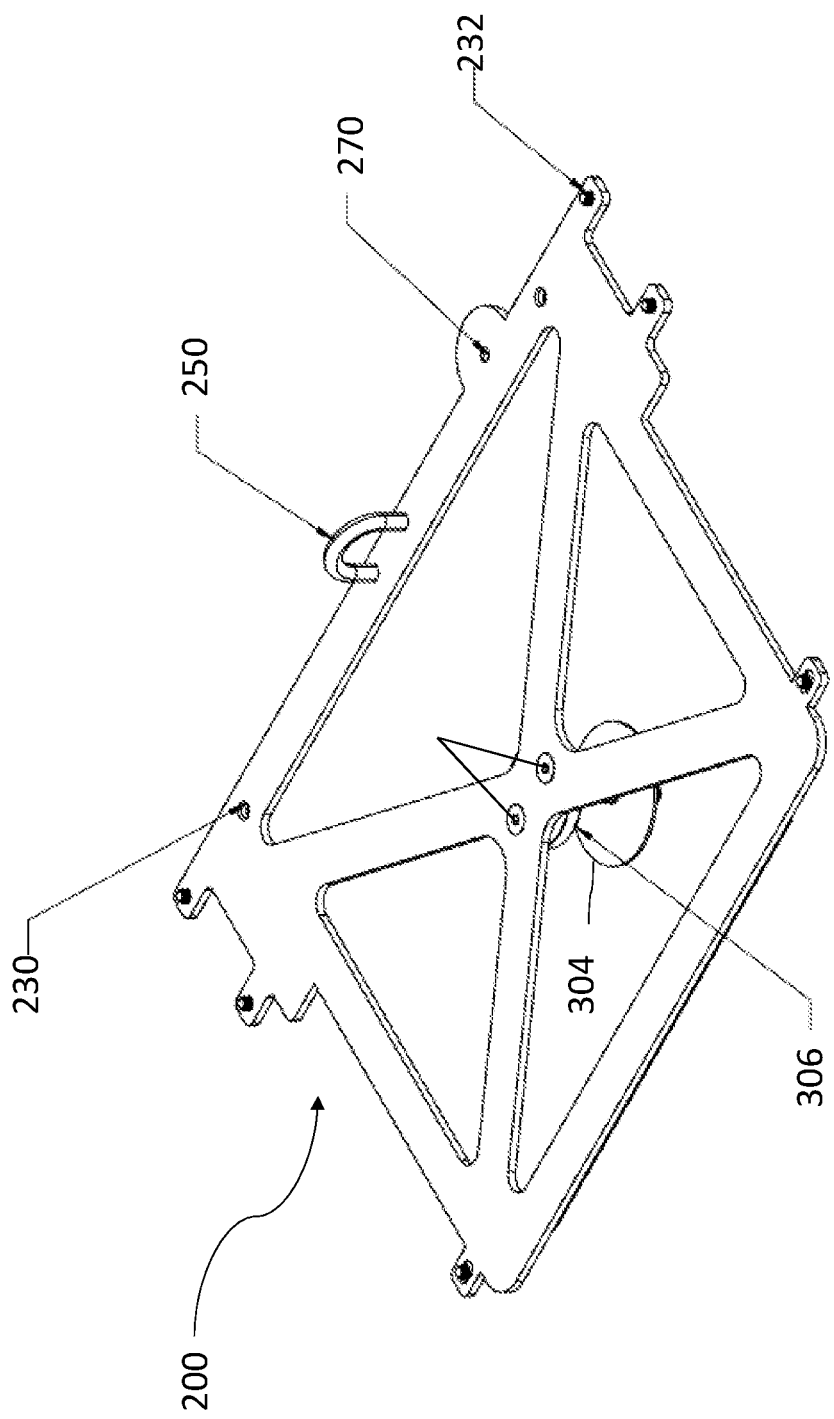
FIG. 16 illustrates another illustrates a top perspective view of an embodiment of the mounting plate.

As illustrated particularly in FIG. 14, the mounting plate 200 may further comprise one or more additional retaining elements 266 configured to retain a portion of the portable electronic device such as a detachable keyboard (or a keyboard portion of a laptop computer). The one or more additional retaining elements 266 may be separately coupled to the mounting plate 200 via one or more supplemental coupling portions 234. In this embodiment, the one or more supplemental coupling portions 234 may each include an extension or an opening configured to removeably couple or aid in removeably coupling to the one or more additional retaining elements 266 to the support plate 200. In an embodiment, the or more additional retaining elements 266 are formed with the mounting plate 200 as a single unitary component.

When the security apparatus 100 is coupled to the mounting plate 200, the mounting plate 200 may be used to anchor the security apparatus 100 to a display fixture 80 instead of anchoring the security apparatus 100 directly to the display fixture 80 as has been described above. Accordingly, the mounting plate 200 may comprise or otherwise define one or more coupling features that enable or aid in coupling the mounting plate 200 to the display fixture 80. For example, one or more of the perimeter and/or supplemental supports 211, 212, 213, 214, 215, 216, 217, 218 may define through holes 230 configured to accept a fastener, such as a bolt, wire, or any suitable fastener to couple the mounting plate 200 to the display fixture 80. In other embodiments, the coupling features may include coupling extensions (similar to the securing members 155) configured to be coupled to the display surface 80, such as with a securing member coupler 170. In an embodiment, the plurality of supplemental supports 211, 213, 215, 217 may be joined together, fused together or otherwise come together at an area 280 away from the plurality of perimeter supports 212, 214, 216, 218. As shown in the figures, the area 280 may be configured to receive one or more fastening members 240, such as standardized bolts, screws, or any other fastening means that is capable of removeably coupling the mounting plate 200 to the display fixture 80.

The mounting plate 200 may be specifically configured to couple to a fastener 300 that comprises a coupling interface 306 that may removeably coupled to the mounting plate 200 using one or more fastening members 240, and a threaded extension 302 extending from the coupling interface 306. The threaded extension 302 traverses the display surface 80 and a securing member 308, such as a nut, is configured to engage a free end of the threaded extension 302 and be tightened to secure the mounting plate 200 to the display surface 80. In an embodiment one or more washers or spacers 304 may be positioned to contact the securing member 308 and/or the coupling interface 306 when the fastener 300 is installed. In an example, the fastener 300 may be a 39-40 mm adapter to secure to a display fixture 80 that is exclusively used by specific retailers.

Figure 17A:
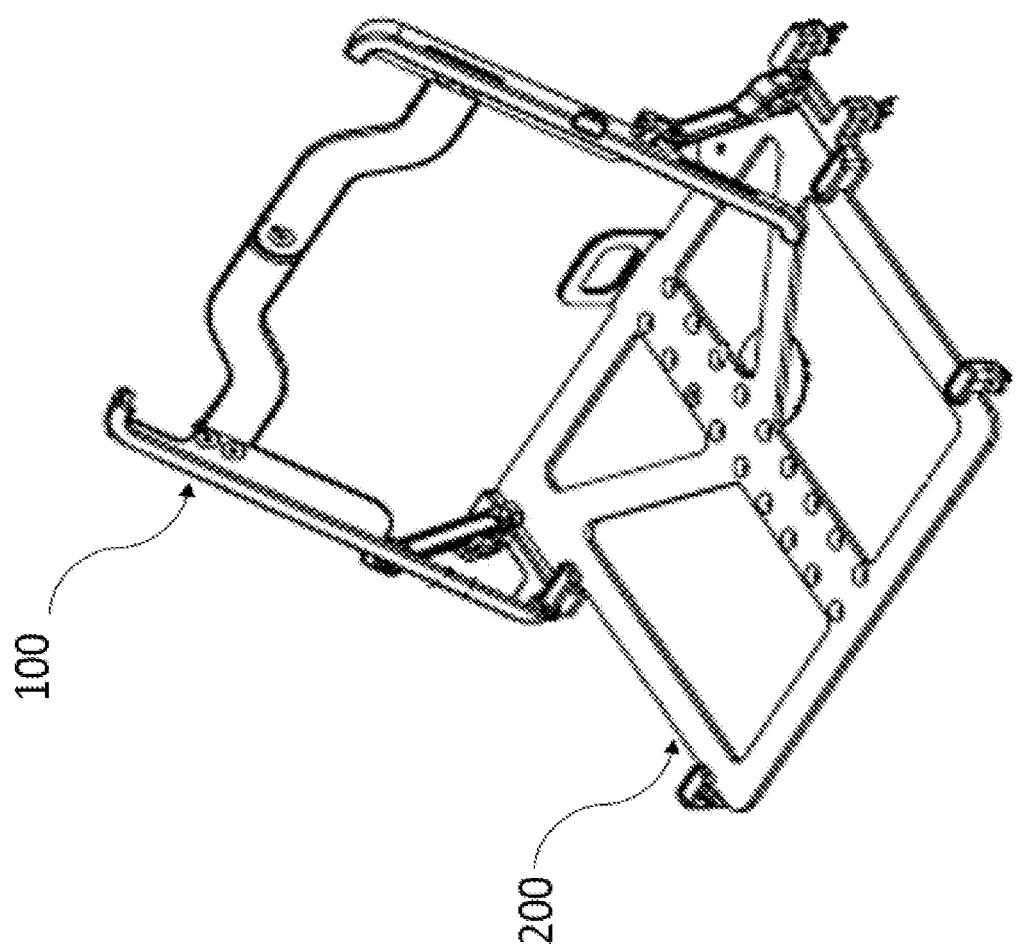
FIG. 17A illustrates a perspective view of another embodiment of the security apparatus.
Figure 17B:
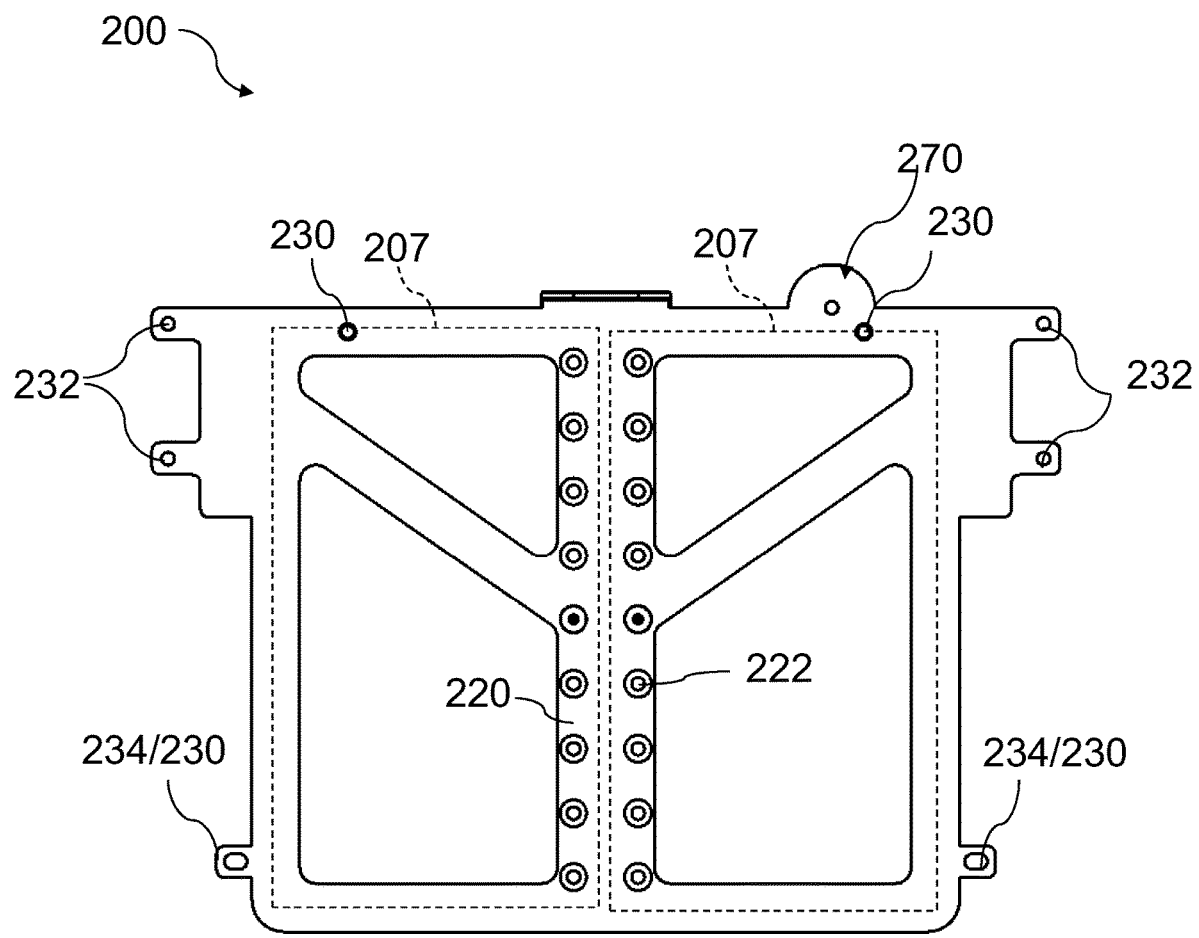
FIG. 17B illustrates a top plan view of an embodiment of a mounting plate comprising a central support.
Figure 18:
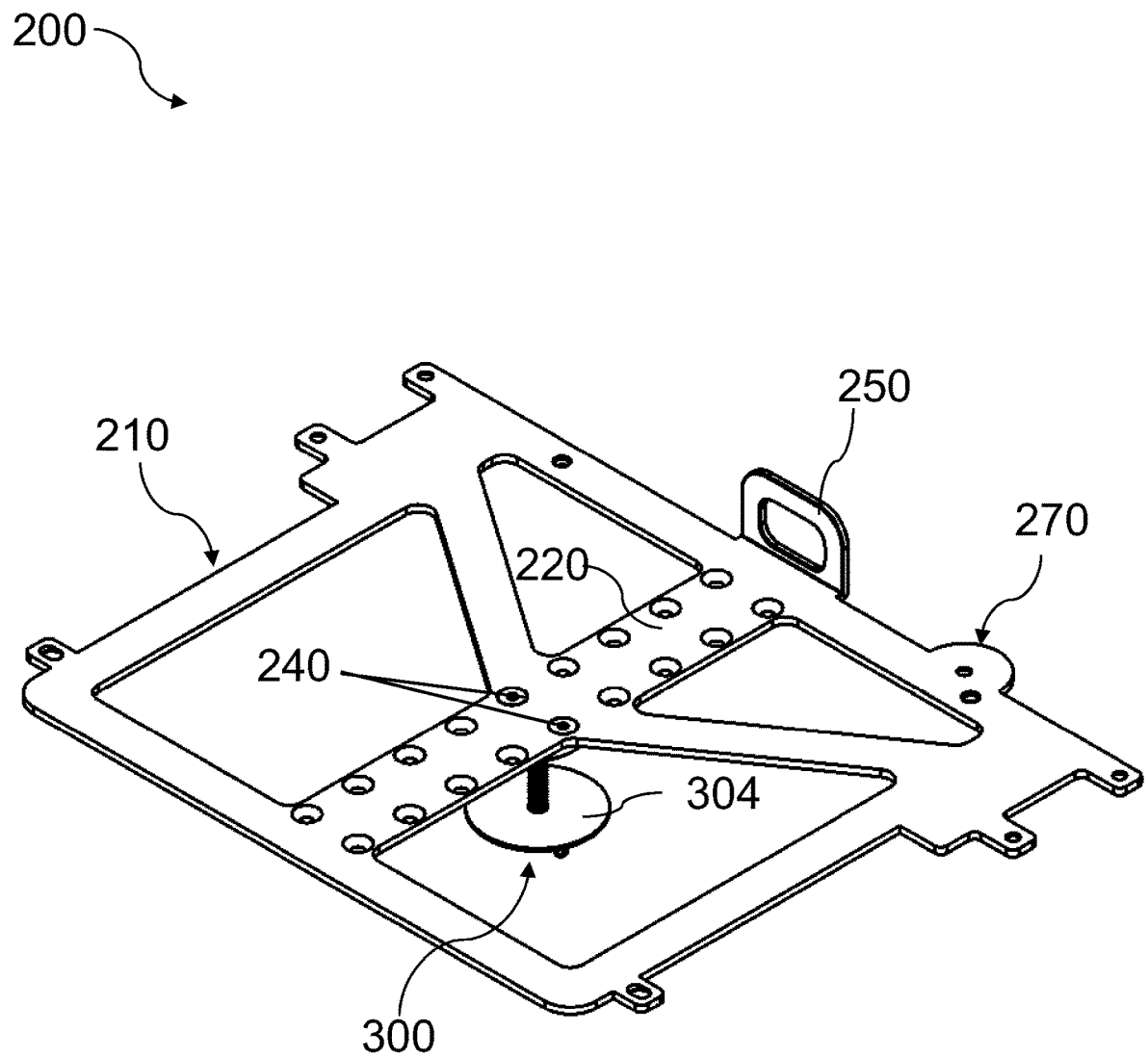
FIG. 18 illustrates a top perspective view of the embodiment of the mounting plate of FIG. 17.
Figure 19:
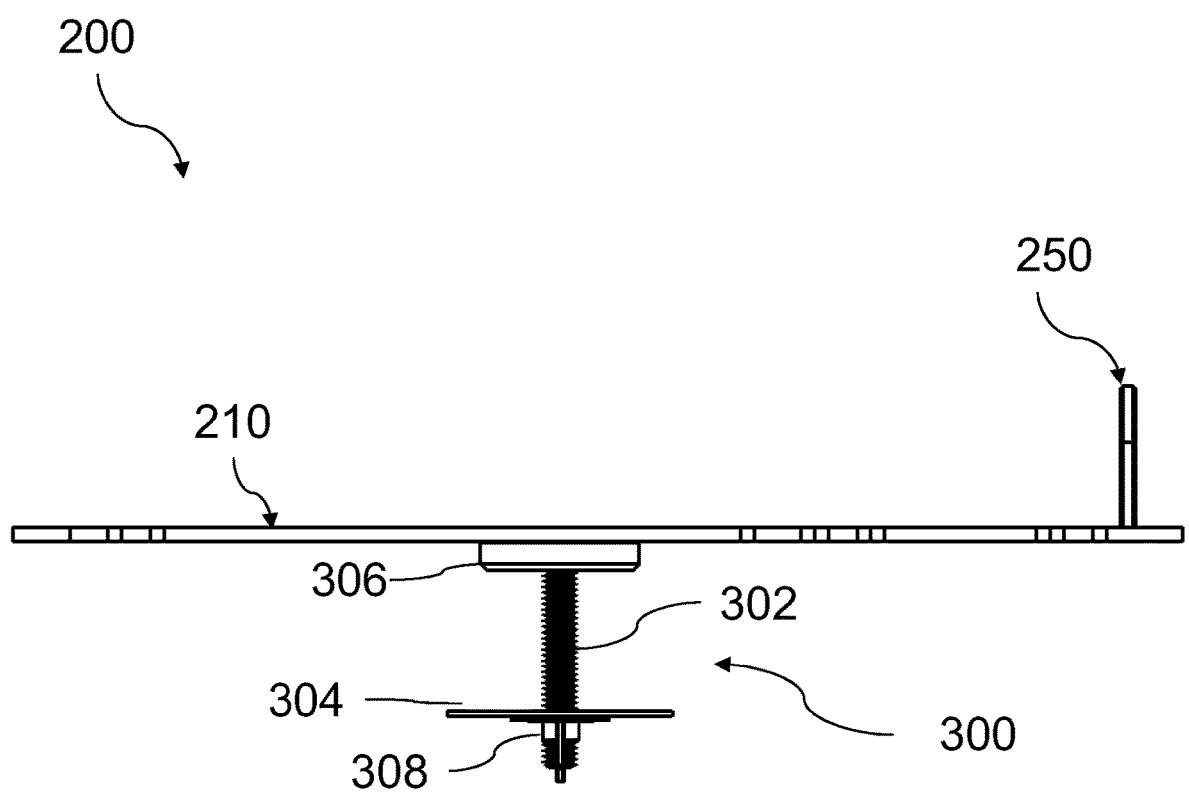
FIG. 19 illustrates a side elevational view of the embodiment of the mounting plate of FIG. 17.

As illustrated in the embodiments of FIGS. 17 and 18, the frame 210 of the mounting plate 200 may further or alternatively comprise a central support 220 that generally bisects the perimeter shape of the frame 210. For example, the perimeter shape may approximately define a square such that the central support 220 bisects the square to form two rectangular sections 207 (FIG. 17) defined by the perimeter and the central support 220. The central support 220 defines a plurality of through holes 222 that traverse the central support 220 and are configured to enable the mounting plate 200 to be coupled to a display fixture 80 using one or more fastening members 240 (or fastener 300). The plurality of through holes 222 enable flexibility in the positioning of the mounting plate 200 in relation to any pre-positioned or pre-formed hole or couplers on the display fixture 80. In other embodiments of the mounting plate 200, the central support 220 may be alternately positioned such that is does not bisect the perimeter shape of the frame 210.

The mounting plate 200 may further or alternatively comprise one or more anchors or mounting eyelets 250 configured to enable the mounting plate 200 to be coupled to a tether 350 (FIG. 20), which is in turn anchored to the display fixture 80. The one or more mounting eyelets 250 may be separate components that are removeably coupled to the mounting plate 200 or they may be formed as a single unitary component with the mounting plate 200. The tether 350 may comprise a length of flexible material, such as cord or wire that is coupled to the display fixture 80 at one end and couple to the mounting eyelet 250 at an opposing end. In an embodiment, the opposing end of the tether 350 may include a locking member (not shown) configured to enable fast coupling and decoupling of the mounting plate 200 to the tether 350. When the mounting plate 200 is coupled to the tether 350, the mounting plate 200 and the coupled security apparatus 100 may be picked up or otherwise moved together relative to the display fixture 80 while still enabling the portable electronic device that is secured within the security apparatus 100 to be protected from theft. In other embodiments, the one or more anchors may secure the mounting plate 200 to the display fixture 80 such that the mounting plate 200 is inhibited from moving relative to the display fixture 80.

The plurality of perimeter supports 212, 214, 216, 218 and the plurality of supplemental supports 211, 213, 215, 217 may each comprise a bottom surface that contributes to the entire bottom surface of the mounting plate 200 that are configured to face and/or contact the display fixture 80 when the mounting plate 200 is in proper use. A portion of the entire bottom surface may have a double-sided tape 180 (FIG. 21), or other such adhesive coated substrate, affixed to it and is configured to adhesively couple the mounting plate 200 to the display fixture 80. Accordingly, the embodiments of the mounting plate 200 illustrated in the FIGS. 14-22 are capable of being secured or coupled to the display fixture 80 in several different manners such that a retailer is able to choose the manner of securing the mounting plate 200 that best suites the particular retail setting and portable electronic device being secured.

Figure 20:
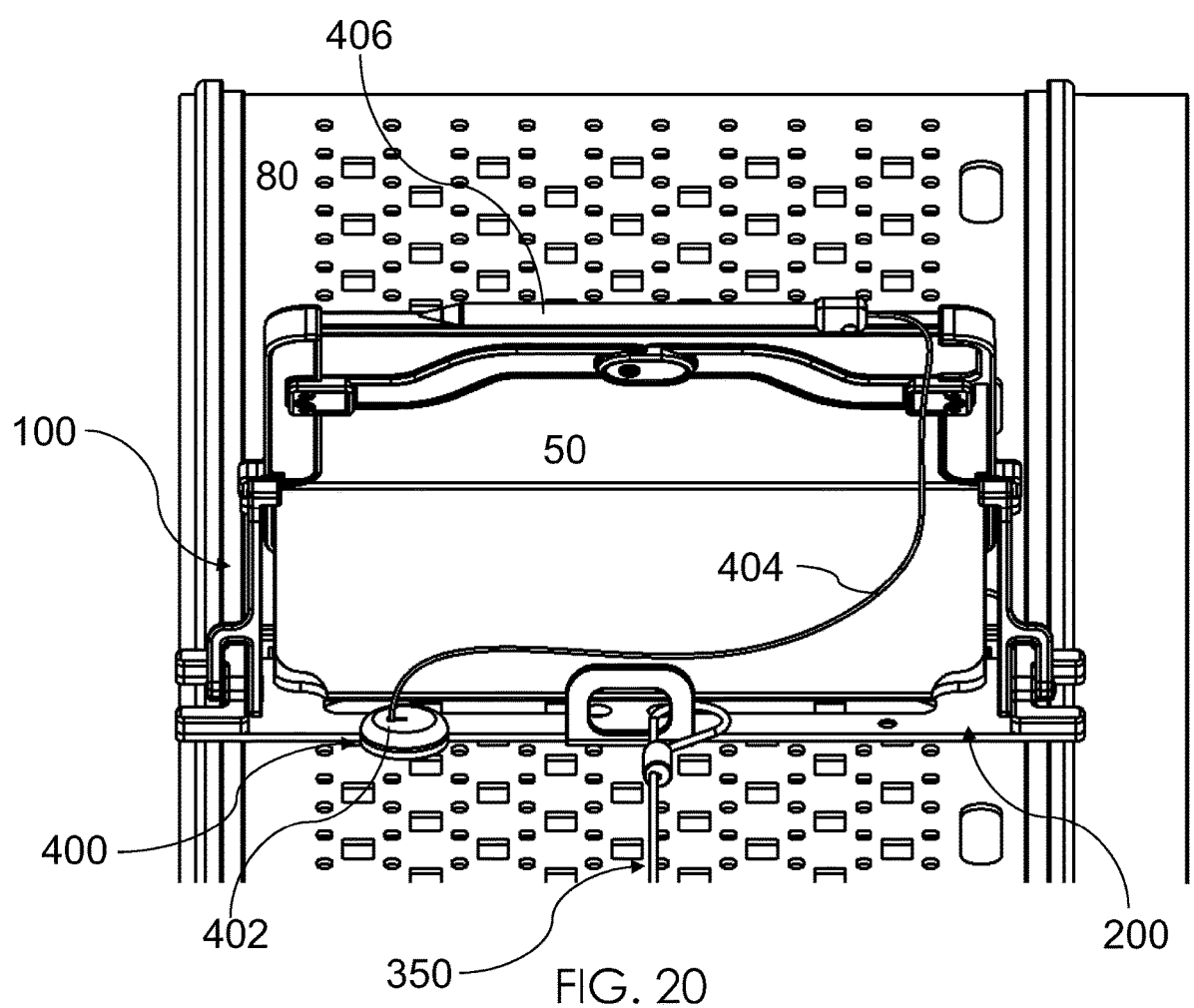
FIG. 20 illustrates an embodiment of the mounting plate coupled to an embodiment of the tablet security apparatus and secured to a display fixture via a tether cable.
Figure 21:
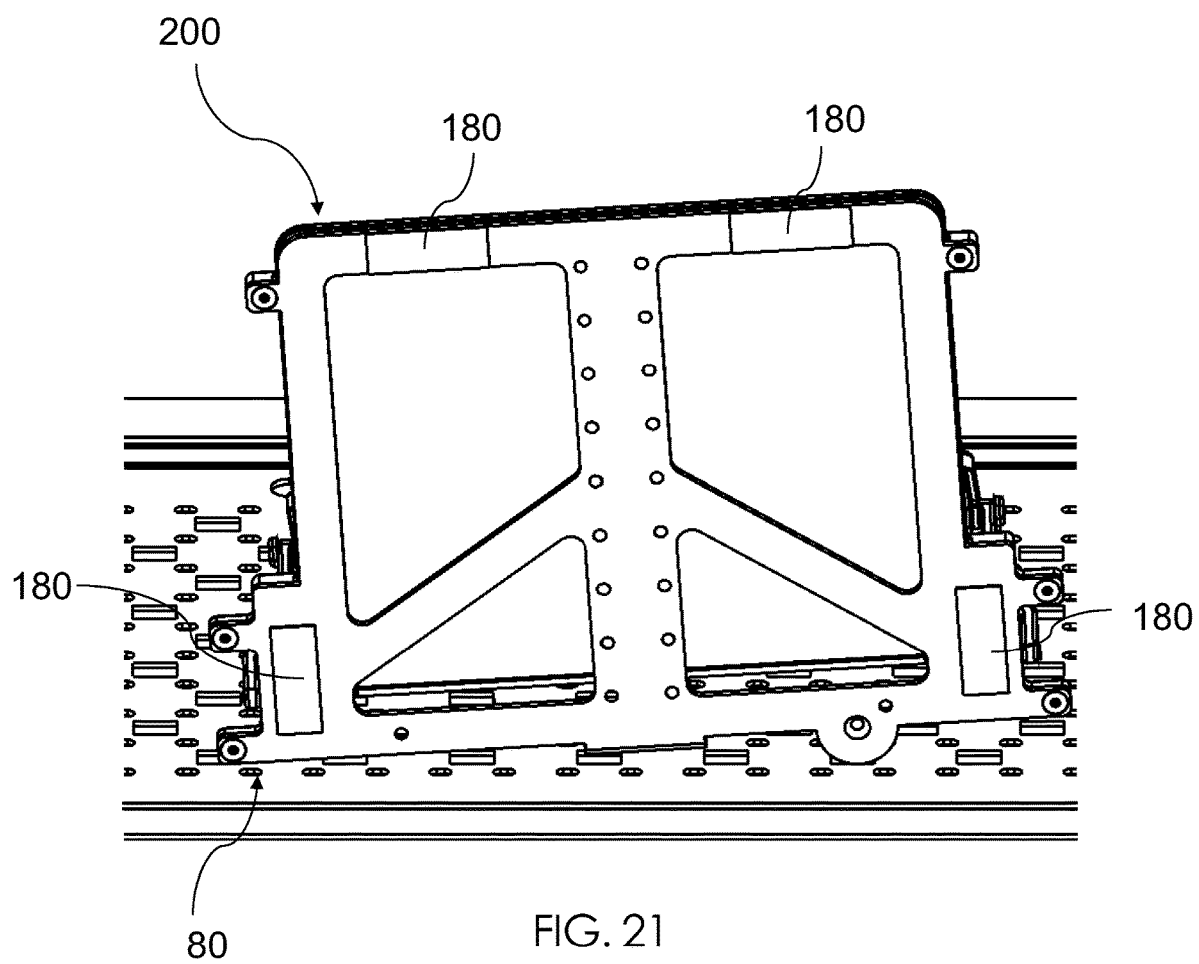
FIG. 21 illustrates a bottom perspective view of an embodiment of the mounting plate with a plurality of adhesive contacts for coupling the mounting plate to a display surface.
Figure 22:
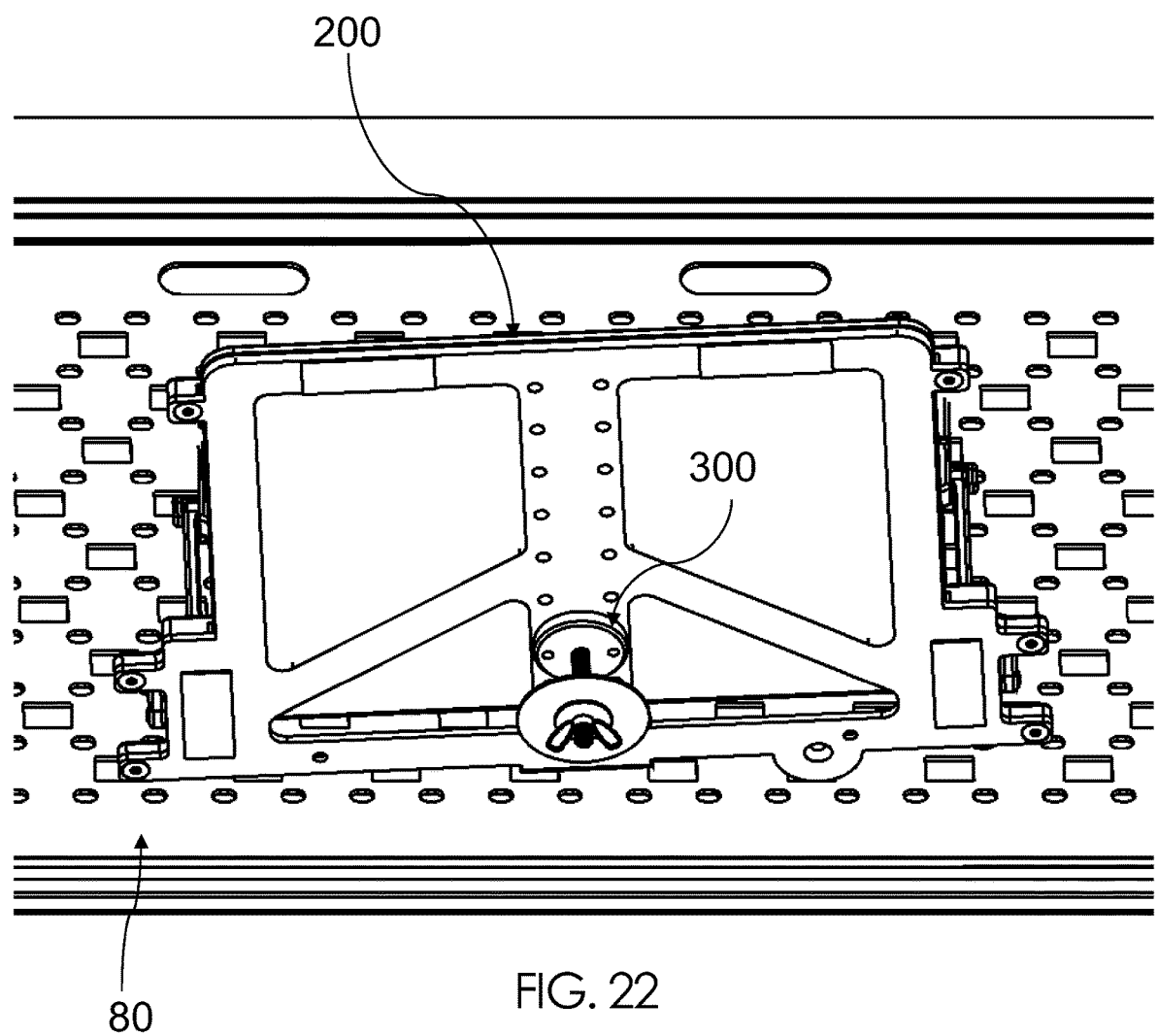
FIG. 22 illustrates a bottom perspective view of an embodiment of the mounting plate with a fastener configured to couple the mounting plate to a display surface.

The mounting plate 200 may further be enabled to simultaneously couple or secure one or more accessories to be used with the portable electronic device being secured by the security apparatus 100 coupled to the mounting plate 200. Accordingly, the mounting plate 200 may further comprise one or more accessory mounting portions 270. For example, in FIG. 20, an accessory 400 such as an Apple® Pencil or other stylus, may be coupled to the mounting plate 200 at the accessory mounting portion 270 such that it may be used alongside an iPad® that is secured within the security apparatus 100 that is also coupled to the mounting plate 200. As shown in FIG. 20, the stylus accessory 400 comprises a base or holder 402 coupled or otherwise secured to the accessory mounting portion 270 and a stylus implement 406 coupled to the base 402 with a wire, or cord 404. Accordingly, the accessory that is mounted to the mounting plate 200 may be moved relative to the display fixture 80 with the mounting plate 200 and the security apparatus 100.

In order to secure a portable electronic device, such as a tablet or display with keyboard accessory 60, within the security apparatus 100, the first and second retaining portion 112, 114 are in the unlocked state and pivoted relative to each other to accept the tablet. The first and second retaining portions 112, 114 are then pivoted relative to each other to retain two or more sides of the tablet. The first and second retaining portions are then moved to the locked state such that they are inhibited from moving relative to each other. The keyboard accessory 60 is then positioned such that the base 150 contacts the keyboard accessory 60. The base 150 is then coupled to a display fixture 80 using the securing member couplers 170. The keyboard accessory 60 is secured by being trapped between a portion of the base 150 and the display fixture 80. In some embodiments, the keyboard accessory 60 is further retained between the first and second retaining portions 112, 114. The tablet is secured between the first and second retaining portions 112, 114 and is able to be pivot relative to the display fixture 80 (and hence the secured keyboard accessory 60) while still being retained by the first and second retaining portions 112, 114.

When a security system is used comprising a security apparatus 100 and a mounting plate 200, the tablet and keyboard accessory 60 is secured within the security apparatus 100 as discussed above. Instead of securing the base 150 of the security apparatus to the display fixture 80, the base 150 is secured to the mounting plate 200. In an embodiment, the base 150 is secured to the mounting plate 200 using the securing member couplers 170. In turn, the mounting plate 200 is secured to the display fixture 80 using one or more fasteners or a tether/anchor system. In this manner, secured devices may be easily and quickly removed from secure display and replaced.

The embodiments of the security apparatus 100 and mounting plate 200 may further comprise an alarm. In an embodiment, the alarm may be triggered by a pressure change, such as by removing a portable electronic device form the security apparatus 100 and/or the mounting plate 200. In another embodiment, the alarm may be triggered by unlocking the security apparatus 100 or otherwise opening the security apparatus 100 or separating the security apparatus 100 from the mounting plate 200 and/or the display fixture 80. In other embodiments, the alarm may be activated in response to damage to, removal of, or tampering with the security apparatus 100 and/or the mounting plate 200. The alarm may comprise an audio, visual, and/or haptic signal.

One or more components of the embodiments of security apparatus 100 and/or the mounting plate 200 described above may be comprised of one or more types of metal, such as steel, zinc, or aluminum, or one or more types of plastic, such as PA6 (Nylon 6), ABS (Acrylonitrile butadiene styrene), or POM (Polyoxymethylene). In an embodiment, one or more components of the security apparatus 100 may be comprised of a combination of metallic and plastic components. One or more components of the embodiments of the security apparatus 100 and the mounting plate 200 may be comprised of different sizes, thicknesses and shapes while still keeping with the spirit, function, and intent of each device.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus comprising:
a display support comprising,
　a first retaining portion including a first holder,
　a second retaining portion pivotally coupled to the first retaining portion and including a second holder, and
　a lock assembly defining a locked state and an unlocked state; and
a keyboard retainer comprising,
　a first base pivotally coupled to the first retaining portion and including a top surface extending along a top surface plane, and an opposing bottom surface, wherein the first base comprises,
　　one or more securing members extending from the bottom surface of the first base, and
　　one or more retainers extending above the top surface plane of the first base and each comprising a retaining member extending away from the first base,
　a second base pivotally coupled to the second retaining portion and including a top surface extending along a top surface plane, and an opposing bottom surface, wherein the second base comprises,
　　one or more securing members extending from the bottom surface of the second base, and
　　one or more retainers extending above the top surface plane of the second base and each comprising a retaining member extending away from the second base,
wherein when the lock assembly is in the unlocked state, the first holder and the second holder are enabled to pivot relative to each other, and
wherein in the locked state, the first holder and the second holder are inhibited from pivoting relative to each other.

2. The security apparatus of claim 1, wherein the first holder further comprises a first brace extending from the first support, wherein the first brace and first support extend along a same plane.

3. The security apparatus of claim 1, wherein the second holder further comprises a second brace extending from the second support, wherein the second brace and second support extend along a same plane.

4. The security apparatus of claim 1, wherein:
the first holder further comprises at least one side extending along a side axis;
the at least first holder partially defines a pocket;
the second holder further comprises at least one side that at least partially defines a pocket; and
at least one of the sides defines an opening.

5. The security apparatus of claim 1, wherein the one or more securing members comprise a threaded surface.

6. The security apparatus of claim 4, wherein the first holder and the second holder each comprise an end portion, wherein the end portion extends along an axis that intersects the side axis.

7. A security apparatus comprising:
a support assembly comprising,
　a first retaining portion,
　a second retaining portion pivotally coupled to the first retaining portion, and
　a lock assembly defining a locked state and an unlocked state, wherein in the unlocked state, the first retaining portion and the second retaining portion are enabled to pivot relative to each other, and wherein in the locked state, the first retaining portion and the second retaining portion are inhibited from pivoting relative to each other; and
a keyboard retainer comprising,
　a first base pivotally coupled to the first retaining portion and including a top surface extending along a top surface plane, and an opposing bottom surface, wherein the first base comprises,
　　one or more securing members extending from the bottom surface of the first base, and
　　one or more retainers extending above the top surface plane of the first and each comprising a retaining member extending away from the first base,
　a second base pivotally coupled to the second retaining portion and including a top surface extending along a top surface plane, and an opposing bottom surface, wherein the second base comprises,
　　one or more securing members extending from the bottom surface of the second base, and
　　one or more retainers extending above the top surface plane of the second base and each comprising a retaining member extending away from the second base.

8. The security apparatus of claim 7, wherein the first retaining portion defines a pocket configured to retain a portion of a portable electronic device.

9. The security apparatus of claim 8, wherein the second retaining portion defines a pocket configured to retain a portion of a portable electronic device.

10. The security apparatus of claim 7, wherein the one or more securing members comprise a threaded surface.

* * * * *